(12) United States Patent
Liu et al.

(10) Patent No.: US 11,541,904 B2
(45) Date of Patent: Jan. 3, 2023

(54) SYSTEMS AND METHODS FOR SELECTIVE AUTONOMOUS VEHICLE RIDERSHIP AND CONTROL

(71) Applicant: Uber Technologies, Inc., San Francisco, CA (US)

(72) Inventors: Zhe Liu, San Francisco, CA (US); Mark Yen, San Francisco, CA (US); Nathan Falk, San Francisco, CA (US); Brent Justin Goldman, San Francisco, CA (US); Shenglong Gao, San Francisco, CA (US); Aaron Matthew Crum, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 325 days.

(21) Appl. No.: 16/991,701

(22) Filed: Aug. 12, 2020

(65) Prior Publication Data
US 2021/0380126 A1   Dec. 9, 2021

Related U.S. Application Data

(60) Provisional application No. 63/036,590, filed on Jun. 9, 2020.

(51) Int. Cl.
*B60W 40/08* (2012.01)
*B60W 60/00* (2020.01)
(Continued)

(52) U.S. Cl.
CPC .......... *B60W 60/001* (2020.02); *B60W 40/08* (2013.01); *G01C 21/3438* (2013.01);
(Continued)

(58) Field of Classification Search
CPC . B60W 60/001; B60W 40/08; G01C 21/3438; G05D 1/0088; G05D 1/0291;
(Continued)

(56) References Cited

U.S. PATENT DOCUMENTS

2020/0133306 A1   4/2020   Chadha et al.

FOREIGN PATENT DOCUMENTS

WO   2021252609   12/2021

OTHER PUBLICATIONS

International Search Report and Written Opinion for Application No. PCT/US2021/036583, dated Aug. 6, 2021, 14 pages.

*Primary Examiner* — Mathew Franklin Gordon
(74) *Attorney, Agent, or Firm* — Schwegman Lundberg & Woessner, P.A.

(57) ABSTRACT

Systems and methods for autonomous vehicle operations are provided. An example computer-implemented method includes obtaining data indicative of vehicle fleet feature(s) associated with an autonomous vehicle fleet. The method includes obtaining data indicative of a vehicle service request associated with a user, the vehicle service request indicating a request for a vehicle service. The method includes determining user feature(s) associated with the user. The method includes determining a compatibility of the user and the autonomous vehicle fleet for the vehicle service based at least in part on the fleet feature(s) and the user feature(s). Determining the compatibility can include predicting how the autonomous vehicle fleet will perform the vehicle service associated with the vehicle service request based at least in part on the fleet's autonomy capabilities. The method includes communicating data associated with the vehicle service request to a computing system associated with the autonomous vehicle fleet.

20 Claims, 11 Drawing Sheets

(51) Int. Cl.
*G05D 1/00* (2006.01)
*G05D 1/02* (2020.01)
*G01C 21/34* (2006.01)
*G08G 1/00* (2006.01)
*G06Q 50/30* (2012.01)
*G06Q 10/06* (2012.01)
*G06Q 30/02* (2012.01)
*G06N 5/02* (2006.01)

(52) U.S. Cl.
CPC ......... *G05D 1/0088* (2013.01); *G05D 1/0291* (2013.01); *G06N 5/02* (2013.01); *G06Q 10/06315* (2013.01); *G06Q 30/0201* (2013.01); *G06Q 50/30* (2013.01); *G08G 1/22* (2013.01); G05D 2201/0213 (2013.01); G06Q 30/0282 (2013.01)

(58) Field of Classification Search
CPC ............. G05D 2201/0213; G06N 5/02; G06Q 10/06315; G06Q 30/0201; G06Q 50/30; G06Q 30/0282; G08G 1/22
See application file for complete search history.

600

| FLEET | PRIORITY/RANK |
|---|---|
| FIRST AV FLEET | 1 / CS1 |
| SECOND AV FLEET | 2 / CS2 |
| THIRD AV FLEET | 3 / CS3 |
| FIFTH AV FLEET | 4 / CS4 |
| FOURTH AV FLEET | 5 / CS5 |
| SEVENTH AV FLEET | 6 / CS6 |
| EIGHTH AV FLEET | 7 / CS7 |
| SIXTH AV FLEET | 8 / CS8 |
| . . . | . . . |

*FIG. 6*

SYSTEMS AND METHODS FOR SELECTIVE AUTONOMOUS VEHICLE RIDERSHIP AND CONTROL

PRIORITY CLAIM

The application is based on and claims benefit of U.S. Provisional Application 63/036,590 having a filing date of Jun. 9, 2020, which is incorporated in its entirety by reference herein.

FIELD

The present disclosure relates generally to performing autonomous vehicle operations. In particular, the present disclosure relates to improving autonomous vehicle operations via user filtering and vehicle capability analysis.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for autonomous vehicle operations. The method includes obtaining, by a first computing system including one or more computing devices, data indicative of one or more vehicle fleet features associated with an autonomous vehicle fleet. The one or more vehicle fleet features include one or more autonomy capabilities of one or more autonomous vehicles within the autonomous vehicle fleet. The method includes obtaining, by the first computing system, data indicative of a vehicle service request associated with a user. The vehicle service request is indicative of a request for a vehicle service. The method includes determining, by the first computing system via a user profile, data indicative of one or more user features associated with the user. The method includes determining, by the first computing system, a compatibility of the user and the autonomous vehicle fleet for the vehicle service based at least in part on the one or more autonomy capabilities and the one or more user features. Determining the compatibility includes predicting how the one or more autonomous vehicles of the autonomous vehicle fleet will perform the vehicle service associated with the vehicle service request based at least in part on the autonomy capabilities. The method includes communicating, by the first computing system, data associated with the vehicle service request to a second computing system associated with the autonomous vehicle fleet.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of a vehicle service request associated with a user. The vehicle service request is indicative of a request for a vehicle service. The operations include determining, via a user profile, data indicative of one or more user features associated with the user. The operations include obtaining data indicative of one or more vehicle fleet features associated with each of a plurality of candidate autonomous vehicle fleets. The one or more vehicle fleet features associated with a respective candidate autonomous vehicle fleet include autonomy capabilities of the respective autonomous vehicle fleet. The operations include determining at least one selected autonomous vehicle fleet for the provision of the vehicle service based at least in part on the one or more user features and the autonomy capabilities of the at least one selected autonomous vehicle fleet. Determining the at least one selected autonomous vehicle fleet includes predicting how one or more autonomous vehicles of the at least one selected autonomous vehicle fleet will perform the vehicle service associated with the vehicle service request based at least in part on the autonomy capabilities of the at least one selected autonomous vehicle fleet. The operations include communicating data associated with the vehicle service request for the at least one selected autonomous vehicle fleet.

Another example aspect of the present disclosure is directed to one or more tangible, non-transitory computer-readable media storing computer-readable instructions that when executed by one or more processors cause the one or more processors to perform operations. The operations include obtaining data indicative of one or more vehicle fleet features associated with a first autonomous vehicle fleet. The one or more vehicle fleet features include one or more autonomy capabilities of one or more autonomous vehicles within the first autonomous vehicle fleet. The operations include obtaining data indicative of a vehicle service request associated with a user. The vehicle service request is indicative of a request for a vehicle service. The operations include determining, via a user profile, data indicative of one or more user features associated with the user. The operations include determining whether the user and the first autonomous vehicle fleet are compatible for the vehicle service based at least in part on the one or more autonomy capabilities of the one or more autonomous vehicles within the first autonomous vehicle fleet and the one or more user features. Determining whether the user and the first autonomous vehicle fleet are compatible for the vehicle service includes predicting how the one or more autonomous vehicles of the first autonomous vehicle fleet will perform the vehicle service associated with the vehicle service request based at least in part on the autonomy capabilities of the one or more autonomous vehicles.

Other example aspects of the present disclosure are directed to systems, methods, vehicles, apparatuses, tangible, non-transitory computer-readable media, and memory devices for operating autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts an example ranking of autonomous vehicle fleets according to example embodiments of the present disclosure.

DETAILED DESCRIPTION

Figure 1:
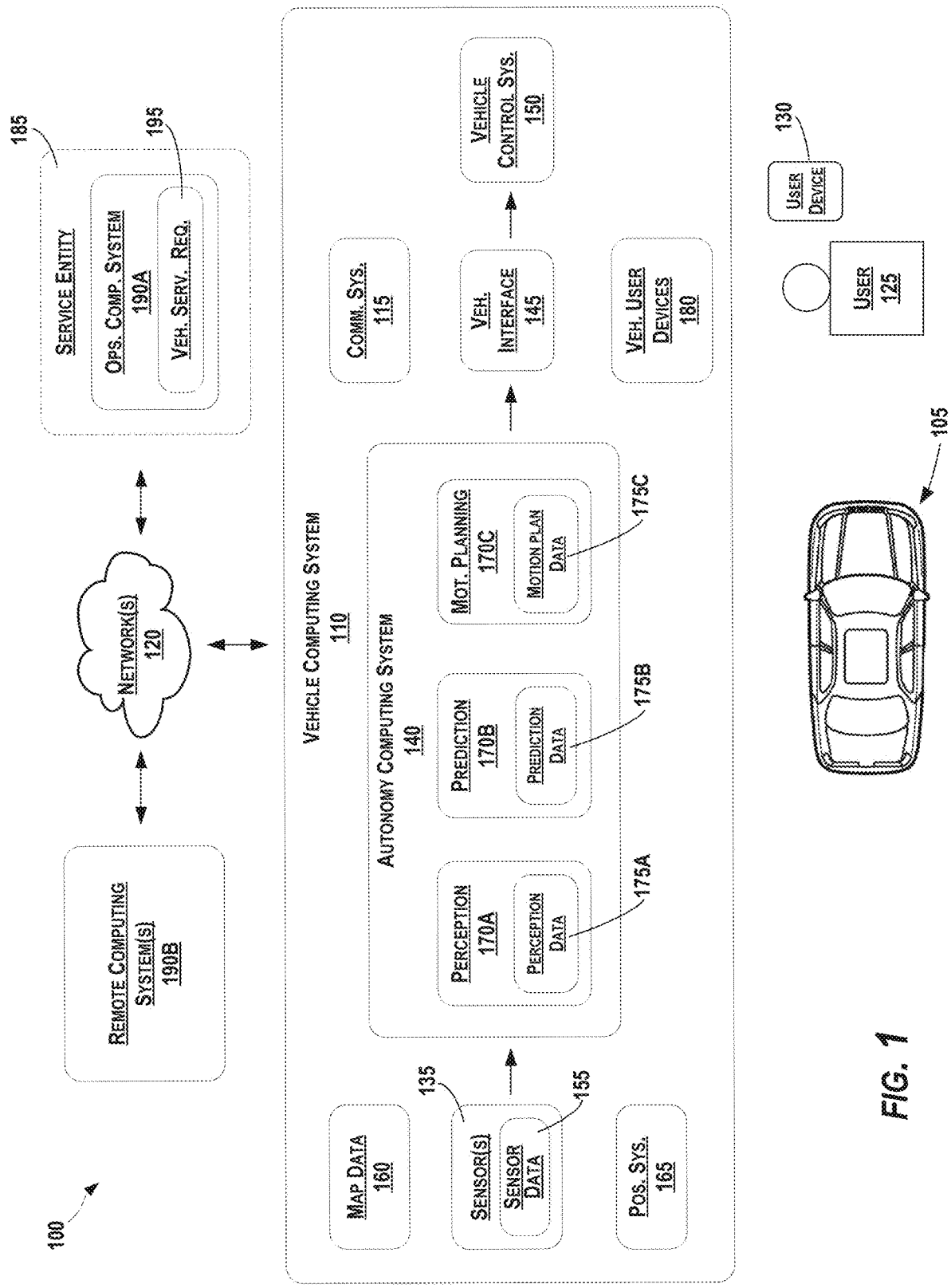
FIG. 1 depicts a block diagram of an example system for controlling an autonomous vehicle according to example embodiments of the present disclosure.

Example aspects of the present disclosure are directed to improved effectiveness of autonomous vehicle operations through efficient user and vehicle filtering. For instance, autonomous vehicles can be utilized to perform vehicle services (e.g., transportation services, etc.). The vehicle services can be offered to users by a service entity (e.g., a company that offers and coordinates the provision of vehicle services). The service entity can utilize a plurality of autonomous vehicle fleets for the provision of vehicle services. An autonomous vehicle fleet can be associated with the service entity (e.g., a "first party" autonomous vehicle fleet) or a third party vehicle provider (e.g., a "third party" autonomous vehicle fleet). A third party vehicle provider can make its autonomous vehicle fleet available to the service entity via the service entity's platform. The service entity can utilize its platform to coordinate and manage the autonomous vehicles of each fleet to provide vehicle services to users requesting vehicle services.

The technology of the present disclosure can increase the effectiveness and efficiency of autonomous vehicle operations via improved matching of users with compatible autonomous vehicle fleets for requested vehicle services. By way of example, an operations computing system of the service entity (e.g., implementing the platform) can obtain and store vehicle fleet features associated with each autonomous vehicle fleet that is available to the service entity. The vehicle fleet features can provide information about the autonomous vehicles in the respective fleet and/or the vehicle provider associated with the respective fleet. For example, the vehicle fleet features can indicate the autonomy capabilities of the fleet's vehicles as well as vehicle provider preferences for selecting riders for the fleet (e.g., a minimum required user rating, etc.). The operations computing system can obtain a service request associated with a user. The service request can include, for example, a request to transport the user from an origin location to a destination location. In response, the operations computing system can identify user feature(s) associated with the user. The user feature(s) can be stored in/with a user profile and can provide information about the user and the user's history with the service entity. For example, the user feature(s) can indicate the user's rating, the user's historic service usage (e.g., the number of transportation services taken with the service entity), the user's cancellation rate, the user's satisfaction with certain transportation services/routes, the user's product adoption rate (e.g., how quickly the user tries/adopts a new product offering from the service entity, etc.) and/or other features.

The operations computing system can determine whether the user and a first autonomous vehicle fleet are compatible with one another based on the vehicle fleet feature(s) and the user feature(s). For example, the operations computing system can determine that a user rating associated with the user is above a preferred rating threshold of the fleet's vehicle provider and that the user has taken more than a preferred threshold number of transportation services. The operations computing system can determine that in order to transport the user from the user's origin location to a requested destination location, an autonomous vehicle of the first autonomous vehicle fleet would likely take a route that omits taking U-turns and unprotected left turns because the vehicle's autonomy capabilities do not allow for such maneuvers. The operations computing system can determine that the user has provided positive feedback on previous transportation services (e.g., performed by human driven vehicles) that included similar routes. Thus, the operations computing system can determine that the user and the first autonomous vehicle fleet are compatible because the user meets the vehicle provider's preferred rider characteristics and the user has historically been satisfied with the types of routes that would need to be taken by a vehicle of this particular fleet. In response, the operations computing system can communicate a vehicle service assignment to the vehicle provider (or an autonomous vehicle within the fleet) requesting performance of the user's requested vehicle service.

In this way, the systems and methods of the present disclosure can improve the ability of the service entity's operations computing system/platform to match users with compatible autonomous vehicle fleets. This can save valuable computational resources of the platform by reducing the processing/memory/bandwidth utilized on potential cancellations, remote assistance, vehicle re-routing, etc. Moreover, this can improve the efficiency of an autonomous vehicle's onboard computing system by allowing it to provide vehicle services within conditions (e.g., routes, etc.) supported by the vehicle's autonomy capabilities. Accordingly, the vehicle computing system can also avoid the allocation of additional computational resources for re-routing, remote assistance, etc.

More particularly, an autonomous vehicle (e.g., ground-based vehicle, aerial vehicle, light electric vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. For example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system (that is remote from the autonomous vehicle) can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicles utilized by the service entity to provide vehicle services can be associated with a fleet of the service entity or a third party. A fleet can include one or a plurality of autonomous vehicles. The plurality of autonomous vehicles can be associated with a single entity/party. For example, the service entity may own, lease, etc. a fleet of autonomous vehicles that can be managed by the service entity (e.g., its backend system clients) to provide one or more vehicle services. An autonomous vehicle utilized to provide the vehicle service(s) can be included in this fleet of the service entity. Such autonomous vehicle may be referred to as "service entity autonomous vehicles" or "first party autonomous vehicles" and can be included in a "first party autonomous vehicle fleet." In some implementations, an autonomous vehicle can be associated with a third party vehicle provider such as, for example, an individual, an original equipment manufacturer (OEM), a third party vendor, or another entity. These autonomous vehicles may be referred to as "third party autonomous vehicles" and can be included in a "third party autonomous vehicle fleet." Even though such an autonomous vehicle may not be included in the fleet of autonomous vehicles of the service entity, the service platform can allow the autonomous vehicle(s) associated with a third party to still be utilized to provide the vehicle services offered by the service entity, access the service entity's back-ends systems, etc.

The technology of the present disclosure can improve the efficiency and effectiveness of the service entity's operations computing system/platform as well as the autonomous vehicles themselves by selectively matching users with autonomous vehicle fleets. To help do so, the operations computing system ("a first computing system") can obtain data indicative of one or more vehicle fleet features associated with one or a plurality of autonomous vehicle fleets. The vehicle fleet features can provide information about the autonomous vehicle fleet, the autonomous vehicles in the respective fleet, and/or the vehicle provider associated with the respective fleet.

The vehicle fleet features can indicate one or more vehicle provider preferences. The vehicle provider preferences can indicate, for example, one or more characteristics that the vehicle provider prefers for a user that is to ride in an autonomous vehicle of the vehicle provider's fleet. For example, the vehicle fleet features (e.g., the vehicle provider preference(s)) can include a user rating threshold (e.g., a minimum rating associated with a user of the service entity) and/or a vehicle service usage threshold (e.g., a minimum number of transportation services completed by a user).

Additionally, or alternatively, the vehicle fleet features (e.g., the vehicle provider preference(s)) can include a product adoption rate threshold. The product adoption rate threshold can indicate a threshold time (e.g., days, weeks, etc.) by which a user historically adopts new products/services offered by the service entity. This can be helpful to show, for example, that the user is open to newer technology such as autonomous vehicle ridesharing/ride-hailing. A vehicle provider preference can be a soft preference (e.g., a desire/suggestions that is not required for every rider) or a hard preference (e.g., a requirement that must be met by the user in order to be matched to the autonomous vehicle fleet). In this way, the vehicle provider can generate "whitelists" of users for its autonomous vehicle fleet.

The vehicle fleet feature(s) associated with a respective candidate autonomous vehicle fleet can include the autonomy capabilities of the respective autonomous vehicle fleet. The autonomy capabilities can indicative the capabilities of the autonomous vehicle to autonomously navigate/operate (e.g., while in a fully autonomous mode), the restrictions of an autonomous vehicle, scenarios in which the autonomous vehicle can/cannot operate, and/or other information descriptive of how an autonomous vehicle can or cannot autonomously operate. For instance, the autonomy capabilities can indicate one or more vehicle motion maneuvers that the autonomous vehicle can or cannot autonomously perform (e.g., without human input, while in a fully autonomous mode). By way of example, the autonomy capabilities can indicate whether the autonomous vehicle(s) in a particular fleet can perform a U-turn and/or whether the autonomous vehicle is restricted from performing an unprotected left turn. In another example, the autonomy capabilities can indicate that an autonomous vehicle is capable of operating in a respective traffic area (e.g., a high traffic area such as an urban setting, a minimal traffic area such as a rural setting, etc.) and/or one or a plurality of geographic fences/boundaries identifying where the autonomous vehicle can travel (e.g., based on the map data available to the autonomous vehicle, vehicle provider preferences, etc.).

The operations computing system can obtain the vehicle fleet feature(s) in a variety of manners. In some implementations, the operations computing system can obtain data indicative of the fleet feature(s) via a platform portal that is accessible by a third party vehicle provider. In some implementations, the vehicle provider can communicate the vehicle fleet feature(s) via service level agreement(s) or other avenues outside the portal. In some implementations, the operations computing system can include one or more systems or models (e.g., machine-learned model(s)) that can learn the vehicle fleet feature(s) over time. For example, the operations computing system can calculate the service assignment acceptance rate of a vehicle provider (over time) to learn that the vehicle provider only accepts service assignments for user's above a certain user rating threshold. In another example, the operations computing system can predict the autonomy capabilities of an autonomous vehicle by evaluating the routes traversed by the autonomous vehicle while performing vehicle services. The vehicle fleet feature(s) for each autonomous vehicle fleet can be stored in an accessible database and can be updated over time.

As described herein, the operations computing system can obtain data indicative of a service request. The service request can be indicative of a request for a vehicle service. For example, the service request can be indicative of an origin location and a destination location. The service request can indicate the type of vehicle service that is being requested. For example, the service request can include a request for transportation of a user and/or item from the origin location to a destination location. The service request can indicate a type/size/class of vehicle such as, for example, a sedan, an SUV, luxury vehicle, standard vehicle, etc. The service request can indicate a product of the service entity. For example, the service request can indicate that the user is requesting a transportation pool product by which the user would potentially share the vehicle (and costs) with other users/items. In some implementations, the service request can explicitly request for the vehicle service to be provided by an autonomous vehicle or a human-driven vehicle. In some implementations, the service request can indicate a number of users that will be riding in the vehicle/utilizing the vehicle service. In some implementations, the service request can indicate preferences/special assistance of an associated user (e.g., music preferences, climate preferences, wheelchair accessibility, etc.) and/or other information.

The service request can be associated with a user. The user can be the one that submits the service request (e.g., via an application on a mobile device). In some implementations, the user may not be the user that submits the service request. The service request can be indicative of the user. For example, the service request can include an identifier associated with the user and/or the user's profile/account with the service entity. The service request can be generated in a manner that avoids the use of personally identifiable information and/or allows the user to control the types of information included in the service request. The service request can also be generated, communicated, stored, etc. in a secure manner to protect information.

The operations computing system can determine data indicative of user features associated with the user. The operations computing system can do this based at least in part on the service request. For example, the operations computing system can utilize the identifier associated with the user and/or the user's account/profile to look-up user feature(s) associated with the user in an accessible database. The user feature(s) can be stored in a data structure that allows for such retrieval/storage. For example, the user feature(s) can be stored in and/or with a user profile of the user that can be accessed/retrieved by the operations computing system. The user profile can be maintained by the service entity and include various information about the user such as, for example, the user feature(s). In this way, the operations computing system can determine, via the user profile, data indicative of the user feature(s) associated with the user.

The user features can include a variety of information. The user features can include, for example, a user rating associated with the user. The user rating can be indicative of a rating and/or an aggregate of a plurality of ratings of the user's behavior with respect to the vehicle services of the service entity. Such ratings can be provided by others associated with the service. For example, a human driver of a human-driven vehicle can rate the user after transporting the user for a transportation service. In another example, a vehicle provider (or an autonomous vehicle) can rate the user after transporting the user in an autonomous vehicle for a transportation service.

The user feature(s) can include a vehicle service usage history associated with the user. The vehicle service usage history can indicate the number of vehicle services (and type) that the user has taken/completed with the service entity. This can include, for example, a number of times the user has been previously transported by a human-driven vehicle and/or an autonomous vehicle for a requested vehicle service.

The user feature(s) can include a cancellation rate associated with the user. The cancellation rate can indicate when and how often (e.g., frequency, ratio, percentage, etc.) the user cancels a service request. The cancellation rate can also indicate the circumstances associated with the cancellation. For example, the cancellation rate can indicate the type of vehicle assigned to the service request that was cancelled (e.g., human-driven vehicle, autonomous vehicle, vehicle make/model, etc.), the estimated time of arrival associated with the service request that was cancelled, a route associated with the service request that was cancelled, etc.

In some implementations, the user(s) features can include a vehicle type preference associated with the user. The vehicle type preference can indicate a type of vehicle that is preferred by the user (e.g., make, model, size, class, etc.).

In some implementations, the user feature(s) can include a service rating provided by the user for at least one previous vehicle service. The service rating can be indicative of a level of satisfaction of the user with one or more previously requested vehicle services. For example, the user can provide a rating/feedback associated with a vehicle service after or during the provision of the vehicle service. A lower rating or negative feedback (e.g., negative reviews, comments, low tip, etc.) can be indicative of a lower level of satisfaction, while a higher rating or positive feedback (e.g., positive reviews, comments, high tip, etc.) can be indicative of a higher level of satisfaction. The service rating can include an aggregate service rating (over a plurality of vehicle services) and/or a service rating associated with an individual vehicle service. The service rating can include information indicative of the circumstances associated with a particular rating. For example, the service rating associated with a vehicle service can be stored/associated with information that indicates the vehicle type, route, estimated/actual time of arrival, type of vehicle service, vehicle characteristics (e.g., make, model, size, class, etc.), and/or other information.

In some implementations, the user feature(s) can include a product adoption rate associated with the user. The product adoption rate can indicate, for example, the rate, time frame (e.g., number of day(s), week(s), etc.), frequency, etc. at which a user tries and/or adopts (e.g., uses a plurality of times) a new product offered by the service entity. For example, the service entity can offer a new aerial ridesharing/ride-hailing service. The product adoption rate can indicate how many days passed from the initial product launch (e.g., in the user's area) until the user utilized the aerial ridesharing/ride-hailing service. In another example, the product adoption rate can indicate that the user tried and/or adopted a certain percentage/fraction of new products offered by the service entity (e.g., over a certain time period). In another example, the product adoption rate can indicate the rate at which new products were not tried/adopted by the user. In some implementations, the product adoption rate can be indicative of the products tried/adopted by a user and the products not tried/adopted by the user.

In some implementations, the user feature(s) can include an autonomous vehicle usage history associated with the user. The autonomous vehicle usage history can indicate a number of times, frequency, ratio, percentage, etc. that the user explicitly requested or utilized an autonomous vehicle for a vehicle service. The autonomous vehicle usage history can also indicate which autonomous vehicles and/or autonomous vehicle fleets provided the vehicle service to the user.

The user feature(s) can include one or more other features associated with the user. For example, the user feature(s) an include a price sensitivity of a user. The price sensitivity can indicate how sensitive a user is to the price of vehicle services. For example, the user may launch an application of the service entity but forgo or cancel a service request based on a price of the vehicle service at the time. This user feature may be valuable for matching a user to an autonomous vehicle fleet that can minimize the cost associated with a vehicle service (e.g., a fleet that reduces travel time based on the fleet's autonomy capabilities, a fleet that charges a lower percentage/fee, etc.).

The operations computing system can determine a compatibility of the user and an autonomous vehicle fleet for the requested vehicle service. For instance, the operations computing system can determine whether one or more autonomous vehicle fleets are compatible with the user based at least in part on the vehicle fleet features of a respective autonomous vehicle fleet (e.g., vehicle provider preferences, autonomy capabilities of the fleet's autonomous vehicle(s), etc.) and the user feature(s). The user and an autonomous vehicle fleet can be considered compatible, for example, when it is predicted that the user and vehicle provider are suitable for one another, would be satisfied with the match, would be satisfied with the vehicle service assignment/vehicle service, etc. For instance, as further explained herein, determining the compatibility can include predicting how one or more autonomous vehicles of an autonomous vehicle fleet will perform the vehicle service associated with the service request based at least in part on the autonomy capabilities. This can include a route the autonomous vehicle(s) is predicted to traverse when performing the vehicle service (e.g., driving to a destination, etc.), one or more vehicle motion maneuvers the autonomous vehicle(s) may or may not perform (e.g., U-turns, protected left turns, etc.), estimated speed(s), estimated vehicle service durations, estimated pick-up/arrival time(s), etc. The compatibility can be expressed as a compatibility score (as further described herein), a binary decision (e.g., compatible or incompatible), and/or in other manners.

The operations computing system can determine compatibility in a variety of manners. For example, the operations computing system can utilize an algorithm that weighs the user feature(s) and the vehicle fleet feature(s). The algorithm can compare the features of the user and the autonomous vehicle fleet/vehicle provider. The algorithm can calculate a compatibility score based on these features. The algorithm can utilize a scoring function that employs weights to account for the effect of each feature on the scoring function. The weights can be set based at least in part on input from the vehicle provider, the service entity, and/or a user. For example, in the event the vehicle provider's preference for a certain user rating threshold is a hard preference (e.g., a requirement that must be met), the weight for this user feature can be higher. In some implementations, the weights can be set to a default (e.g., if no input is provided by a vehicle provider and/or user). In some implementations, the weights associated with each feature can be adjusted over time as the operations computing system matches users and autonomous vehicle fleets and learns what features may be more important for compatibility. In some implementations, the weights can be different based at least in part on the geographic region in which the user is located and/or the vehicle service that is being offered.

The operations computing system can calculate the compatibility score by assigning a value to each of the user feature(s) (e.g., a value for a user rating can reflect the actual user rating) and to each of the vehicle fleet features(s) (e.g., a value for a user rating threshold can be the set threshold value), applying the respective weights to each feature to obtain a weighted feature value for each feature, and aggregating the weighted feature values. The compatibility score can be the aggregation of the weighted feature values. The compatibly score can be expressed as a value, percentage, ratio, letter grade, and/or in other manners. In the event that the compatibility score is above a compatibility threshold, the operations computing system can determine that the user and an autonomous vehicle fleet are compatible. In examples where such a threshold is utilized, the compatibility determination can be binary (e.g., compatibility is "1" or "YES" or "COMPATIBLE" if above the threshold, compatibility is "0" or "NO" or "INCOMPATIBLE" if below the threshold).

Additionally, or alternatively, the operations computing system can utilize one or more machine-learned models to determine the compatibility of a user and an autonomous vehicle fleet for a service request/vehicle service. For example, the one or more machine-learned models can be configured to determine compatibility between a user and an autonomous vehicle fleet. The models can be or can otherwise include various machine-learned models such as neural networks (e.g., deep neural networks) or other multi-layer non-linear models. For example, the operations computing system can include a machine-learned compatibility model. In some implementations, the machine-learned compatibility model can be a binary classifier model that indicatives whether a user and an autonomous vehicle fleet are compatible or incompatible.

The machine-learned compatibility model can be trained (e.g., via one or more machine-learning techniques such as back-propagation, etc.) to determine whether a user and one or more autonomous vehicle fleets are compatible based on user feature(s) and/or vehicle fleet feature(s). The training can include, for example, one or more supervised training techniques that use labeled training data. For instance, the machine-learned compatibility model can be trained over the labeled training data. The labeled training data can include annotations indicating a compatible user/fleet pair and/or an incompatible user/fleet pair.

By way of example, a training computing system can receive a training output descriptive of the model's classification of a user/fleet pair within the training data (e.g., whether the user and the autonomous vehicle fleet are compatible or not). The training computing system can analyze the training output to determine the accuracy of the machine-learned compatibility model. For instance, the training computing system can compare the output to the training data to determine whether the machine-learned compatibility model correctly identified the compatibility. If further training is required (e.g., to increase one or more confidence level(s), to increase accuracy, etc.), the training computing system can provide additional training data and/or indicate that adjustments may need to be made to the machine-learned compatibility model.

The operations computing system can input data indicative of one or more user features and/or one or more fleet features into the trained machine-learned compatibility model. The machine-learned compatibility model can identify the user and an autonomous vehicle associated with the features as compatible or incompatible (e.g., based on predictive modeling, etc.). This can include, for example, predicting how an autonomous vehicle will perform the vehicle service associated with the service request based at least in part on the associated autonomy capabilities (e.g., predicting a route to be traversed, vehicle motion maneuvers to be avoided/performed, etc.) and predicting whether the user will be satisfied with such a performance based at least in part on the user feature(s). The operations computing system can obtain, as an output of the machine-learned compatibility model, data indicating the compatibility of the user and the autonomous vehicle fleet (e.g., whether the user and an autonomous vehicle fleet are compatible). In some implementations, the output can be indicative of a compatibility score.

The operations computing system can determine the compatibility of the user with a plurality of autonomous vehicle fleets. In some implementations, the operations computing system can evaluate compatibility for an autonomous vehicle fleet and stop when it determines that a first autonomous vehicle fleet is compatible with the user (and move on to matching the user/fleet). In the event that the operations computing system determines that the user and the first autonomous vehicle fleet are not compatible for the vehicle service, the operations computing system can determine whether the user and a second autonomous vehicle fleet are compatible for the vehicle service. This can be done, for example, based at least in part on one or more autonomy capabilities of the autonomous vehicle(s) within the second autonomous vehicle fleet and the user feature(s).

In some implementations, the operations computing system can evaluate a plurality of autonomous vehicle fleets before selecting one for the user. The operations computing system can do so in an iterative manner to determine a compatibility score associated with each autonomous vehicle fleet. For example, operations computing system can determine that the user is compatible with a first autonomous vehicle fleet, a second autonomous vehicle fleet, and a third autonomous vehicle fleet. The operations computing system can determine a compatibility score for each of these autonomous vehicle fleets. The operations computing system can rank the plurality of autonomous vehicle fleets in a priority order based at least in part on the compatibility score. The operations computing system can select the autonomous vehicle fleet (e.g., the first autonomous vehicle fleet) with the highest compatibility score for the provision of the vehicle service for the user. This can allow the operations computing system to have alternative fleet options, in the event the selected autonomous vehicle fleet (e.g., its vehicle provider) rejects the vehicle service assignment.

The following provides some example circumstances that may affect the likelihood of determining that the user and an autonomous vehicle fleet are compatible (e.g., by improving/reducing a compatibility score).

In some implementations, the operations computing system can determine the compatibility of user and a first autonomous vehicle fleet based at least in part on one or more vehicle provider preferences and the user feature(s) associated with the user. For instance, the operations computing system can determine that the user and the autonomous vehicle fleet may be compatible for the vehicle service based at least in part on at least one of the vehicle provider's user rating threshold, vehicle service usage threshold, or product adoption rate threshold. By way of example, the operations computing system can determine that the user rating associated with the user is above the preferred user rating threshold, that the user's vehicle service usage history is above the preferred vehicle service usage threshold, and/or that the user's product adoption rate is above the preferred product adoption rate threshold of the first autonomous vehicle fleet and/or its vehicle provider. This can help increase the likelihood that the user and an autonomous vehicle fleet are compatible.

Additionally, or alternatively, the operations computing system can determine the compatibility of the user and a first autonomous vehicle fleet based at least in part on one or more autonomy capabilities of the first autonomous vehicle fleet and the one or more user features. This can include determining compatibility based on a predicted satisfaction of the user. For instance, the operations computing system can predict the compatibility of the user and the autonomous vehicle fleet based at least in part on the one or more autonomy capabilities and a service rating provided by the user for at least one previous vehicle service. The operations computing system can determine a candidate route from an origin location to a destination location for the one or more autonomous vehicles of the first autonomous vehicle fleet based at least in part on the one or more autonomy capabilities. The operations computing system can predict that the user and the autonomous vehicle fleet are compatible based at least in part on the candidate route. The operations computing system can predict a potential satisfaction of the user with the autonomous vehicle fleet based at least in part on the candidate route and the one or more user features (e.g., the service rating provided by the user).

By way of example, the operations computing system can determine that in order to transport the user from the user's origin location to a requested destination location, the autonomous vehicle would likely take a candidate route that omits taking U-turns and unprotected left turns because the vehicle's autonomy capabilities do not allow for such maneuvers. Using the service rating information for the user, the operations computing system can determine that the user previously provided a high service rating and/or positive feedback for a previous vehicle service that was provided via a human-driven vehicle. In this example, the previous vehicle service included a route (e.g., through a city) that included no U-turns or unprotected left turns, although such maneuvers would have decreased the user's estimated and/or actual time of arrival. Thus, in this example, the operations computing system can determine that the user and the autonomous vehicle fleet may be compatible at least because the user would likely be satisfied by the candidate route traversed by the autonomous vehicle providing the vehicle service.

In some implementations, the operations computing system can determine the compatibility of the user and a first autonomous vehicle fleet based at least in part on the one or more autonomy capabilities and the cancellation rate associated with the user. For example, the operations computing system can determine an estimated time of arrival at a destination location (e.g., specified in the service request) based at least in part on the autonomy capabilities of the first autonomous vehicle fleet. This can be determined by using the fastest route available to a vehicle with such capabilities. The operations computing system can obtain data indicative of the cancellation rate associated with the user. The cancellation rate can be associated with the user cancelling previous vehicle services provided by via human-driven vehicles. Based on the cancellation rate, the operations computing system can determine that the user does not have a tendency to cancel service requests with an estimate time of arrival similar to the one determined for the first autonomous vehicle (e.g. within a certain time range with respect to the origin/destination locations, time of day, etc.). The operations computing system can determine that the user and the first autonomous vehicle fleet may be compatible for at least this reason.

Additionally, or alternatively, the operations computing system can predict a willingness of the user to travel in an autonomous vehicle of the first autonomous vehicle fleet based at least in part on a product adoption rate associated with the user. By way of example, the product adoption rate may indicate that the user has a tendency to try and/or adopt new products offered by the service entity within a relative short time frame (e.g., within a week of product launch). As such, the operations computing system can predict that the user may be more willing to utilize a vehicle service provided by an autonomous vehicle. For at least this reason, the operations computing system can determine that the user and the autonomous vehicle fleet are compatible.

In some implementations, the operations computing system can determine a compatibility of a user and a first autonomous vehicle fleet based on a similar autonomous vehicle fleet. For example, the operations computing system can identify an autonomous vehicle fleet that is similar to the first autonomous vehicle fleet based at least in part on the autonomy capabilities of each fleet. The similar autonomous vehicle fleet can have similar autonomy capabilities as the first autonomous vehicle fleet (e.g., 70%, 80%, 90%, etc. similar). The operations computing system can obtain data indicative of a level of satisfaction of the user associated with the similar autonomous vehicle fleet. Such information can be determined from the user's autonomous vehicle usage history and/or service ratings. The operations computing system can determine that the user and the autonomous vehicle fleet are compatible for the vehicle service based at least in part on the level of satisfaction of the user associated with the similar autonomous vehicle fleet. For example, if the user provided a high service rating for a vehicle service provided by the similar autonomous vehicle fleet, the operations computing system can determine that user would likely be satisfied with a vehicle service provided by the first autonomous vehicle fleet.

The operations computing system can communicate data associated with the service request to at least one selected autonomous vehicle fleet. This can include communicating data associated with the service request to a second computing system associated with the autonomous vehicle fleet. In some implementations, the second computing system associated with the autonomous vehicle fleet can be a computing system associated with a third party vehicle provider of the autonomous vehicle fleet. This can occur, for example, when the selected autonomous fleet is a third party autonomous vehicle fleet. Additionally, or alternatively, the second computing system associated with the autonomous vehicle fleet can be, for example, a vehicle computing system located onboard an autonomous vehicle of the autonomous vehicle fleet. This can occur, for example, when the selected autonomous vehicle fleet is a first party autonomous vehicle fleet.

The data associated with the service request can include various information. For example, the data associated with the service request can be and/or can include a vehicle service assignment based at least in part on the service request. The vehicle service assignment can indicate the user's origin, requested destination, and/or other service conditions. The vehicle service assignment can be formulated as a command for an autonomous vehicle in the fleet to provide the vehicle service. The command may not be rejected unless the autonomous vehicle is physically unable to complete the command or it would be unsafe for the autonomous vehicle to complete the command. The operations computing system can utilize such commands for the autonomous vehicle(s) that are included in the dedicated supply of the service entity (e.g., first party autonomous vehicles). In some implementations, the vehicle service assignment can be formulated as a request for an autonomous vehicle in the fleet to provide the vehicle service. The request may be accepted or rejected. The operations computing system can utilize such requests for the autonomous vehicle(s) that are included in the non-dedicated supply of the service entity (e.g., certain third party autonomous vehicles). In some implementations, the data associated with the service request can include other information such as, for example, one or more of the user features associated with the user, incentives for acceptance (e.g., increased compensation, priority treatment), etc.

In some implementations, the operations computing system can communicate the data associated with the service request based on a priority order of autonomous vehicle fleets or for a bidding opportunity. For example, as described herein, the operations computing system can determine a plurality of selected autonomous vehicle fleets for the provision of the vehicle service. The operations computing system can communicate data associated with the service request to each of the plurality of selected autonomous vehicle fleets based at least in part on a priority order of the selected autonomous vehicle fleets (e.g., in their ranked compatibility score order). Additionally, or alternatively, the data associated with the service request can be communicated to all of the compatible autonomous vehicle fleets at the same or similar time frame with a request for the vehicle provider/autonomous vehicle fleet to bid for the vehicle service. The autonomous vehicle fleet/vehicle provider that provides the winning bid (e.g., lowest cost, fastest arrival time, etc.) can be assigned the vehicle service.

The vehicle service assignment can be accepted or rejected by a vehicle provider. For example, the operations computing system can obtain data indicative of an acceptance of the vehicle service (e.g., from a second computing system). In such a case, an autonomous vehicle of the autonomous vehicle fleet can be configured to initiate travel for the vehicle service (e.g., to travel to pick-up a user/item at the origin location). The operations computing system can obtain data indicative of a rejection of the vehicle service (e.g., from a second computing system). In such a case, the operations computing system can determine that the user and another autonomous vehicle fleet are compatible for the vehicle service. This can include, for example, the next highest ranked autonomous vehicle fleet (e.g., with the next highest compatibility score). The operations computing system can communicate the data associated with the service request to a third computing system associated with the other autonomous vehicle fleet.

In some implementations, the filtering of users/service requests for a particular autonomous vehicle fleet can be distributed amongst a plurality of parties. For example, an operations computing system associated with a service entity can obtain data indicative of a service request associated with a user. This can include a request to transport the user and/or an item from an origin to a destination. The operations computing system can perform a first filtering action based at least in part on the user feature(s) associated with the user. For example, the operations computing system can obtain data indicative of one or more user features associated with the user via a user profile with the service entity. The operations computing system can obtain data associated with one or more vehicle fleet features. This can include vehicle provider preferences such as, for example, user rating threshold(s), vehicle service usage threshold(s), or product adoption rate threshold(s).

The operations computing system can determine a candidate autonomous vehicle fleet for the service request based at least in part an initial compatibility of the user and the candidate autonomous vehicle fleet. The operations computing system can determine the initial compatibility of the user and a candidate autonomous vehicle fleet based on the user feature(s) and the vehicle provider preference(s). By way of example, the operations computing system can determine that the user and a candidate autonomous vehicle fleet are at least initially compatible because the user rating of the user is above the vehicle provider's preferred user rating threshold, the vehicle service usage history of the user is above the vehicle provider's preferred vehicle service usage threshold, and/or the product adoption rate of the user is above the vehicle provider's preferred product adoption rate. In some implementations, the operations computing system may still pass along data associated with the service request to a vehicle provider even if the user does not meet any or all of these preferences.

The operations computing system can communicate data associated with the service request to another computing system associated with the candidate autonomous vehicle fleet (e.g., a computing system onboard an autonomous vehicle, a vehicle provider computing system, etc.). The data associated with the service request can be indicative of the origin location, destination location, user preferences/accommodations, and/or other information that can help a vehicle provider and/or autonomous vehicle determine whether to undertake the requested vehicle service. In some implementations, the data associated with the service request can include one or more user features.

The other computing system can perform a second filtering action based at least in part on the vehicle fleet feature(s) associated with the candidate autonomous vehicle fleet and/or the user feature(s) associated with the user. The other computing system (e.g., a vehicle provider computing system, etc.) can obtain the data associated with a service request and determine whether or not to accept the service request. To help do so, the other computing system can obtain data indicative of one or more vehicle fleet features. For instance, the other computing system can obtain data indicative of the autonomy capabilities one or more autonomous vehicles in the candidate autonomous vehicle fleet. The other computing system can determine a compatibility (e.g., an updated/subsequent/vehicle provider compatibility) of the user and the candidate autonomous vehicle fleet based at least in part on the vehicle fleet feature(s) and/or the user feature(s). For example, the other computing system can determine whether the vehicle provider would be interested in accepting the service request based at least in part on the vehicle provider preferences (e.g., if the user's rating is above the user rating threshold). In another example, the other computing system can determine that the autonomous vehicle(s) in the autonomous vehicle fleet would need to take a long, inefficient route to complete the service request (e.g., transport the user to the destination) based at least in part on the autonomy capabilities of the candidate autonomous vehicle fleet. As such, the other computing system can determine that the user and the fleet may not be compatible because the user is unlikely to be satisfied and/or the use of autonomous vehicle computing resources would be inefficient, too severe, etc.

The other computing system can communicate (e.g., to the operations computing system) data indicative of an acceptance or a rejection associated with the service request. The operations computing system can receive such data and determine a vehicle service action based at least in part on the rejection or the acceptance. For instance, in the event that the vehicle provider/autonomous vehicle accepts the service request based at least in part on the compatibility, the operations computing system can assign the service request to the candidate autonomous vehicle fleet (and/or an autonomous vehicle in the fleet). The operations computing system can communicate the vehicle service assignment accordingly. In the event that the vehicle provider/autonomous vehicle rejects the service request based at least in part on the compatibility, the operations computing system can determine another candidate autonomous vehicle fleet and the process can be repeated with that other candidate autonomous vehicle fleet.

The systems and methods described herein provide a number of technical effects and benefits. For example, an operations computing system can waste valuable processing and memory resources when it matches a user to an autonomous vehicle that may cause the user to cancel the vehicle service. Further, the back-end support services of the operations computing system (e.g., the service entity platform) may have to utilize its processing, memory, and bandwidth resources to provide remote assistance to a dissatisfied user and/or to re-route an autonomous vehicle for the dissatisfied user. Additionally, an autonomous vehicle may utilize its onboard computing resources if it begins to travel to pick-up a user/item and the vehicle service is cancelled, if the user requests remote assistance, and/or the vehicle is re-routed to accommodate a dissatisfied user. To help avoid the unwanted usage of the operations computing system's and/or vehicle's limited computational resources, the systems and methods of the present disclosure provide improved techniques for effectively selecting autonomous vehicles for the provision of vehicle services. To do so, aspects of the present disclosure allow a computing system to selectively determine which autonomous vehicle fleets are compatible with the user. This can be done, for example, based on the fleet's autonomy capabilities. This can help ensure that the fleet's autonomous vehicles operate with higher confidence. Ultimately, this can help save valuable onboard processing, memory, bandwidth, and/or power resources that may otherwise be used if the vehicle is forced to operate at the edge of its autonomy capabilities. Moreover, the technology of the present disclosure can lead to improved opportunities for vehicle service assignments. This can decrease unwanted vehicle downtime during which the vehicle may still utilize its onboard computing resources without providing a vehicle service.

Example aspects of the present disclosure can provide an improvement to vehicle computing technology, such as autonomous vehicle computing technology. For instance, the systems and methods of the present disclosure improve the functions of an operations computing system/platform as well as autonomous vehicles. For example, a computing system (e.g., an operations computing system that is remote from the autonomous vehicle) can obtain data indicative of one or more vehicle fleet features associated with an autonomous vehicle fleet. The one or more vehicle fleet features can include one or more autonomy capabilities of one or more autonomous vehicles within the autonomous vehicle fleet. The computing system can obtain data indicative of a service request associated with a user. The service request can be indicative of a request for a vehicle service. The computing system can identify data indicative of one or more user features associated with the user. The computing system can determine that the user and the autonomous vehicle fleet are compatible for the vehicle service based at least in part on the one or more autonomy capabilities and the one or more user features. The computing system can communicate data associated with the service request to a second computing system associated with the autonomous vehicle fleet. In this way, a computing system can determine the most appropriate autonomous vehicle fleet to provide a vehicle service to a user based on the circumstances of the autonomous vehicle fleet, the user, and/or the preferences of an associated vehicle provider. Moreover, the computing system can strategically determine which service requests to assign to certain autonomous vehicles based on their fit to the autonomous vehicle. This leads to a more productive use of a vehicle's resources, while reducing the opportunity for the autonomous vehicle to unnecessarily travel for a service that may be cancelled. This also leads to a more efficient/effective use of the resources of the operations computing system.

Various means can be configured to perform the methods and processes described herein. For example, a computing system can include data obtaining unit(s), service request unit(s), user feature unit(s), compatibility determination unit(s), communication unit(s), acceptance/rejection unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including the claims). For instance, the means (e.g., data obtaining unit(s), etc.) can be configured to obtain data indicative of one or more vehicle fleet features associated with an autonomous vehicle fleet. The one or more vehicle fleet features can include one or more autonomy capabilities of one or more autonomous vehicles within the autonomous vehicle fleet. The means (e.g., service request unit(s)) can be configured to obtain data indicative of a service request associated with a user. The service request can be indicative of a request for a vehicle service. The means (e.g., user feature unit(s)) can be configured to identify data indicative of one or more user features associated with the user. The means (e.g., compatibility determining unit(s)) can be configured to determine that the user and the autonomous vehicle fleet are compatible for the vehicle service based at least in part on the one or more autonomy capabilities and the one or more user features. The means (e.g., communication unit(s)) can be configured to communicate data associated with the service request to a second computing system associated with the autonomous vehicle fleet. The means (e.g., acceptance/rejection unit(s)) can be configured to receive data indicative of an acceptance or a rejection of the vehicle service/service request from another system (e.g., of a vehicle provider).

FIG. 1 depicts a block diagram of an example system 100 for controlling and communicating with a vehicle according to example aspects of the present disclosure. As illustrated, FIG. 1 shows a system 100 that can include a vehicle 105 and a vehicle computing system 110 associated with the vehicle 105. The vehicle computing system 100 can be located onboard the vehicle 105 (e.g., it can be included on and/or within the vehicle 105).

The vehicle 105 incorporating the vehicle computing system 100 can be various types of vehicles. For instance, the vehicle 105 can be an autonomous vehicle. The vehicle 105 can be a ground-based autonomous vehicle (e.g., car, truck, bus, etc.). The vehicle 105 can be an air-based autonomous vehicle (e.g., airplane, helicopter, vertical take-off and lift (VTOL) aircraft, etc.). The vehicle 105 can be a light weight elective vehicle (e.g., bicycle, scooter, etc.). The vehicle 105 can be another type of vehicles (e.g., watercraft, etc.). The vehicle 105 can drive, navigate, operate, etc. with minimal and/or no interaction from a human operator (e.g., driver, pilot, etc.). In some implementations, a human operator can be omitted from the vehicle 105 (and/or also omitted from remote control of the vehicle 105). In some implementations, a human operator can be included in the vehicle 105.

The vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a human operator present in the vehicle 105 and/or remote from the vehicle 105). The vehicle 105 can operate in a semi-autonomous operating mode in which the vehicle 105 can operate with some input from a human operator present in the vehicle 105 (and/or a human operator that is remote from the vehicle 105). The vehicle 105 can enter into a manual operating mode in which the vehicle 105 is fully controllable by a human operator (e.g., human driver, pilot, etc.) and can be prohibited and/or disabled (e.g., temporary, permanently, etc.) from performing autonomous navigation (e.g., autonomous driving, flying, etc.). The vehicle 105 can be configured to operate in other modes such as, for example, park and/or sleep modes (e.g., for use between tasks/actions such as waiting to provide a vehicle service, recharging, etc.). In some implementations, the vehicle 105 can implement vehicle operating assistance technology (e.g., collision mitigation system, power assist steering, etc.), for example, to help assist the human operator of the vehicle 105 (e.g., while in a manual mode, etc.).

To help maintain and switch between operating modes, the vehicle computing system 110 can store data indicative of the operating modes of the vehicle 105 in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 110 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. By way of example, such data can instruct the vehicle 105 to enter into the fully autonomous operating mode.

In some implementations, the operating mode of the vehicle 105 can be set onboard and/or near the vehicle 105. For example, the vehicle computing system 110 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 110 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for controlling an autonomous vehicle, communicating with other computing systems, etc.

The vehicle 105 can include a communications system 115 configured to allow the vehicle computing system 110 (and its computing device(s)) to communicate with other computing devices. The communications system 115 can include any suitable components for interfacing with one or more network(s) 120, including, for example, transmitters, receivers, ports, controllers, antennas, and/or other suitable components that can help facilitate communication. In some implementations, the communications system 115 can include a plurality of components (e.g., antennas, transmitters, and/or receivers) that allow it to implement and utilize multiple-input, multiple-output (MIMO) technology and communication techniques.

The vehicle computing system 110 can use the communications system 115 to communicate with one or more computing device(s) that are remote from the vehicle 105 over one or more networks 120 (e.g., via one or more wireless signal connections). The network(s) 120 can exchange (send or receive) signals (e.g., electronic signals), data (e.g., data from a computing device), and/or other information and include any combination of various wired (e.g., twisted pair cable) and/or wireless communication mechanisms (e.g., cellular, wireless, satellite, microwave, and radio frequency) and/or any desired network topology (or topologies). For example, the network(s) 120 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communication network (or combination thereof) for transmitting data to and/or from the vehicle 105 and/or among computing systems.

In some implementations, the communications system 115 can also be configured to enable the vehicle 105 to communicate with and/or provide and/or receive data and/or signals from a remote computing device associated with a user 125 and/or an item (e.g., an item to be picked-up for a courier service). For example, the communications system 115 can allow the vehicle 105 to locate and/or exchange communications with a user device 130 of a user 125. In some implementations, the communications system 115 can allow communication among one or more of the system(s) on-board the vehicle 105.

As shown in FIG. 1, the vehicle 105 can include one or more sensors 135, an autonomy computing system 140, a vehicle interface 145, one or more vehicle control systems 150, and other systems, as described herein. One or more of these systems can be configured to communicate with one another via one or more communication channels. The communication channel(s) can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel(s).

The sensor(s) 135 can be configured to acquire sensor data 155. The sensor(s) 135 can be external sensors configured to acquire external sensor data. This can include sensor data associated with the surrounding environment of the vehicle 105. The surrounding environment of the vehicle 105 can include/be represented in the field of view of the sensor(s) 135. For instance, the sensor(s) 135 can acquire image and/or other data of the environment outside of the vehicle 105 and within a range and/or field of view of one or more of the sensor(s) 135. The sensor(s) 135 can include one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), and/or other types of imaging capture devices and/or sensors. The one or more sensors can be located on various parts of the vehicle 105 including a front side, rear side, left side, right side, top, and/or bottom of the vehicle 105. The sensor data 155 can include image data (e.g., 2D camera data, video data, etc.), RADAR data, LIDAR data (e.g., 3D point cloud data, etc.), audio data, and/or other types of data. The vehicle 105 can also include other sensors configured to acquire data associated with the vehicle 105. For example, the vehicle 105 can include inertial measurement unit(s), wheel odometry devices, and/or other sensors.

In some implementations, the sensor(s) 135 can include one or more internal sensors. The internal sensor(s) can be configured to acquire sensor data 155 associated with the interior of the vehicle 105. For example, the internal sensor(s) can include one or more cameras, one or more infrared sensors, one or more motion sensors, one or more weight sensors (e.g., in a seat, in a trunk, etc.), and/or other types of sensors. The sensor data 155 acquired via the internal sensor(s) can include, for example, image data indicative of a position of a passenger or item located within the interior (e.g., cabin, trunk, etc.) of the vehicle 105. This information can be used, for example, to ensure the safety of the passenger, to prevent an item from being left by a passenger, confirm the cleanliness of the vehicle 105, remotely assist a passenger, etc.

In some implementations, the sensor data 155 can be indicative of one or more objects within the surrounding environment of the vehicle 105. The object(s) can include, for example, vehicles, pedestrians, bicycles, and/or other objects. The object(s) can be located in front of, to the rear of, to the side of, above, below the vehicle 105, etc. The sensor data 155 can be indicative of locations associated with the object(s) within the surrounding environment of the vehicle 105 at one or more times. The object(s) can be static objects (e.g., not in motion) and/or dynamic objects/actors (e.g., in motion or likely to be in motion) in the vehicle's environment. The sensor(s) 135 can provide the sensor data 155 to the autonomy computing system 140.

In addition to the sensor data 155, the autonomy computing system 140 can obtain map data 160. The map data 160 can provide detailed information about the surrounding environment of the vehicle 105 and/or the geographic area in which the vehicle was, is, and/or will be located. For example, the map data 160 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, and/or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); and/or any other map data that provides information that assists the vehicle computing system 110 in processing, analyzing, and perceiving its surrounding environment and its relationship thereto. In some implementations, the map data 160 can include high definition map data. In some implementations, the map data 160 can include sparse map data indicative of a limited number of environmental features (e.g., lane boundaries, etc.). In some implementations, the map data can be limited to geographic area(s) and/or operating domains in which the vehicle 105 (or autonomous vehicles generally) may travel (e.g., due to legal/regulatory constraints, autonomy capabilities, and/or other factors).

The vehicle 105 can include a positioning system 165. The positioning system 165 can determine a current position of the vehicle 105. This can help the vehicle 105 localize itself within its environment. The positioning system 165 can be any device or circuitry for analyzing the position of the vehicle 105. For example, the positioning system 165 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 110 and/or provided to a remote computing system. For example, the map data 160 can provide the vehicle 105 relative positions of the elements of a surrounding environment of the vehicle 105. The vehicle 105 can identify its position within the surrounding environment (e.g., across six axes, etc.) based at least in part on the map data 160. For example, the vehicle computing system 110 can process the sensor data 155 (e.g., LIDAR data, camera data, etc.) to match it to a map of the surrounding environment to get an understanding of the vehicle's position within that environment. Data indicative of the vehicle's position can be stored, communicated to, and/or otherwise obtained by the autonomy computing system 140.

The autonomy computing system 140 can perform various functions for autonomously operating the vehicle 105. For example, the autonomy computing system 140 can perform the following functions: perception 170A, prediction 170B, and motion planning 170C. For example, the autonomy computing system 130 can obtain the sensor data 155 via the sensor(s) 135, process the sensor data 155 (and/or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, and/or other systems that cooperate to perceive the surrounding environment of the vehicle 105 and determine a motion plan for controlling the motion of the vehicle 105 accordingly. In some implementations, one or more of the perception, prediction, and/or motion planning functions 170A, 170B, 170C can be performed by (and/or combined into) the same system and/or via shared computing resources. In some implementations, one or more of these functions can be performed via difference sub-systems. As further described herein, the autonomy computing system 140 can communicate with the one or more vehicle control systems 150 to operate the vehicle 105 according to the motion plan (e.g., via the vehicle interface 145, etc.).

The vehicle computing system 110 (e.g., the autonomy computing system 140) can identify one or more objects that within the surrounding environment of the vehicle 105 based at least in part on the sensor data 135 and/or the map data 160. The objects perceived within the surrounding environment can be those within the field of view of the sensor(s) 135 and/or predicted to be occluded from the sensor(s) 135. This can include object(s) not in motion or not predicted to move (static objects) and/or object(s) in motion or predicted to be in motion (dynamic objects/actors). The vehicle computing system 110 (e.g., performing the perception function 170C, using a perception system, etc.) can process the sensor data 155, the map data 160, etc. to obtain perception data 175A. The vehicle computing system 110 can generate perception data 175A that is indicative of one or more states (e.g., current and/or past state(s)) of one or more objects that are within a surrounding environment of the vehicle 105. For example, the perception data 175A for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape, object highlighting, etc.); class (e.g., pedestrian class vs. vehicle class vs. bicycle class, etc.), the uncertainties associated therewith, and/or other state information. The vehicle computing system 110 can utilize one or more algorithms and/or machine-learned model(s) that are configured to identify object(s) based at least in part on the sensor data 155. This can include, for example, one or more neural networks trained to identify object(s) within the surrounding environment of the vehicle 105 and the state data associated therewith. The perception data 175A can be utilized for the prediction function 175B of the autonomy computing system 140.

The vehicle computing system 110 can be configured to predict a motion of the object(s) within the surrounding environment of the vehicle 105. For instance, the vehicle computing system 110 can generate prediction data 175B associated with such object(s). The prediction data 175B can be indicative of one or more predicted future locations of each respective object. For example, the prediction system 175B can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175B can be indicative of the speed and/or acceleration at which the respective object is predicted to travel along its associated predicted motion trajectory. The vehicle computing system 110 can utilize one or more algorithms and/or machine-learned model(s) that are configured to predict the future motion of object(s) based at least in part on the sensor data 155, the perception data 175A, map data 160, and/or other data. This can include, for example, one or more neural networks trained to predict the motion of the object(s) within the surrounding environment of the vehicle 105 based at least in part on the past and/or current state(s) of those objects as well as the environment in which the objects are located (e.g., the lane boundary in which it is travelling, etc.). The prediction data 175B can be utilized for the motion planning function 170C of the autonomy computing system 140.

The vehicle computing system 110 can determine a motion plan for the vehicle 105 based at least in part on the perception data 175A, the prediction data 175B, and/or other data. For example, the vehicle computing system 110 can generate motion planning data 175C indicative of a motion plan. The motion plan can include vehicle actions (e.g., speed(s), acceleration(s), other actions, etc.) with respect to one or more of the objects within the surrounding environment of the vehicle 105 as well as the objects' predicted movements. The motion plan can include one or more vehicle motion trajectories that indicate a path for the vehicle 105 to follow. A vehicle motion trajectory can be of a certain length and/or time range. A vehicle motion trajectory can be defined by one or more way points (with associated coordinates). The planned vehicle motion trajectories can indicate the path the vehicle 105 is to follow as it traverses a route from one location to another. Thus, the vehicle computing system 110 can take into account a route/route data when performing the motion planning function 170C.

The motion planning system 180 can implement an optimization algorithm, machine-learned model, etc. that considers cost data associated with a vehicle action as well as other objective functions (e.g., cost functions based on speed limits, traffic lights, etc.), if any, to determine optimized variables that make up the motion plan. The vehicle computing system 110 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the vehicle computing system 110 can evaluate the predicted motion trajectories of one or more objects during its cost data analysis to help determine an optimized vehicle trajectory through the surrounding environment. The motion planning system 180 can generate cost data associated with such trajectories. In some implementations, one or more of the predicted motion trajectories and/or perceived objects may not ultimately change the motion of the vehicle 105 (e.g., due to an overriding factor). In some implementations, the motion plan may define the vehicle's motion such that the vehicle 105 avoids the object(s), reduces speed to give more leeway to one or more of the object(s), proceeds cautiously, performs a stopping action, passes an object, queues behind/in front of an object, etc.

The vehicle computing system 110 can be configured to continuously update the vehicle's motion plan and a corresponding planned vehicle motion trajectories. For example, in some implementations, the vehicle computing system 110 can generate new motion planning data 175C/motion plan(s) for the vehicle 105 (e.g., multiple times per second, etc.). Each new motion plan can describe a motion of the vehicle 105 over the next planning period (e.g., next several seconds, etc.). Moreover, a new motion plan may include a new planned vehicle motion trajectory. Thus, in some implementations, the vehicle computing system 110 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 110 can cause the vehicle 105 to initiate a motion control in accordance with at least a portion of the motion planning data 175C. A motion control can be an operation, action, etc. that is associated with controlling the motion of the vehicle 105. For instance, the motion planning data 175C can be provided to the vehicle control system(s) 150 of the vehicle 105. The vehicle control system(s) 150 can be associated with a vehicle interface 145 that is configured to implement a motion plan. The vehicle interface 145 can serve as an interface/conduit between the autonomy computing system 140 and the vehicle control systems 150 of the vehicle 105 and any electrical/mechanical controllers associated therewith. The vehicle interface 145 can, for example, translate a motion plan into instructions for the appropriate vehicle control component (e.g., acceleration control, brake control, steering control, etc.). By way of example, the vehicle interface 145 can translate a determined motion plan into instructions to adjust the steering of the vehicle 105 "X" degrees, apply a certain magnitude of braking force, increase/decrease speed, etc. The vehicle interface 145 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 105 to autonomously travel within the vehicle's surrounding environment.

The vehicle computing system 110 can store other types of data. For example, an indication, record, and/or other data indicative of the state of the vehicle (e.g., its location, motion trajectory, health information, etc.), the state of one or more users (e.g., passengers, operators, etc.) of the vehicle, and/or the state of an environment including one or more objects (e.g., the physical dimensions and/or appearance of the one or more objects, locations, predicted motion, etc.) can be stored locally in one or more memory devices of the vehicle 105. Additionally, the vehicle 105 can communicate data indicative of the state of the vehicle, the state of one or more passengers of the vehicle, and/or the state of an environment to a computing system that is remote from the vehicle 105, which can store such information in one or more memories remote from the vehicle 105. Moreover, the vehicle 105 can provide any of the data created and/or store onboard the vehicle 105 to another vehicle.

The vehicle computing system 110 can include the one or more vehicle user devices 180. For example, the vehicle computing system 110 can include one or more user devices with one or more display devices located onboard the vehicle 15. A display device (e.g., screen of a tablet, laptop, and/or smartphone) can be viewable by a user of the vehicle 105 that is located in the front of the vehicle 105 (e.g., driver's seat, front passenger seat). Additionally, or alternatively, a display device can be viewable by a user of the vehicle 105 that is located in the rear of the vehicle 105 (e.g., a back passenger seat). The user device(s) associated with the display devices can be any type of user device such as, for example, a table, mobile phone, laptop, etc. The vehicle user device(s) 180 can be configured to function as human-machine interfaces. For example, the vehicle user device(s) 180 can be configured to obtain user input, which can then be utilized by the vehicle computing system 110 and/or another computing system (e.g., a remote computing system, etc.). For example, a user (e.g., a passenger for transportation service, a vehicle operator, etc.) of the vehicle 105 can provide user input to adjust a destination location of the vehicle 105. The vehicle computing system 110 and/or another computing system can update the destination location of the vehicle 105 and the route associated therewith to reflect the change indicated by the user input.

The vehicle 105 can be configured to perform vehicle services for one or a plurality of different service entities 185. A vehicle 105 can perform a vehicle service by, for example and as further described herein, travelling (e.g., traveling autonomously) to a location associated with a requested vehicle service, allowing user(s) and/or item(s) to board or otherwise enter the vehicle 105, transporting the user(s) and/or item(s), allowing the user(s) and/or item(s) to deboard or otherwise exit the vehicle 105, etc. In this way, the vehicle 105 can provide the vehicle service(s) for a service entity to a user.

A service entity 185 can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services. The vehicle services can be wholly performed by the vehicle 105 (e.g., travelling from the user/item origin to the ultimate destination, etc.) or performed by one or more vehicles and/or modes of transportation (e.g., transferring the user/item at intermediate transfer points, etc.).

An operations computing system 190A of the service entity 185 can help to coordinate the performance of vehicle services by autonomous vehicles. The operations computing system 190A can include and/or implement one or more service platforms of the service entity. The operations computing system 190A can include one or more computing devices. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the operations computing system 190 (e.g., its one or more processors, etc.) to perform operations and functions, such as those described herein matching users and vehicles/vehicle fleets, deploying vehicles, facilitating the provision of vehicle services via autonomous vehicles, etc.

A user 125 can request a vehicle service from a service entity 185. For example, the user 125 can provide user input to a user device 130 to request a vehicle service (e.g., via a user interface associated with a mobile software application of the service entity 185 running on the user device 130). The user device 130 can communicate data indicative of a vehicle service request 195 to the operations computing system 190A associated with the service entity 185 (and/or another associated computing system that can then communicate data to the operations computing system 190A). The vehicle service request 195 can be associated with a user. The associated user can be the one that submits the vehicle service request (e.g., via an application on the user device 130). In some implementations, the user may not be the user that submits the vehicle service request. The vehicle service request can be indicative of the user. For example, the vehicle service request can include an identifier associated with the user and/or the user's profile/account with the service entity 185. The vehicle service request 195 can be generated in a manner that avoids the use of personally identifiable information and/or allows the user to control the types of information included in the vehicle service request 195. The vehicle service request 195 can also be generated, communicated, stored, etc. in a secure manner to protect information.

The vehicle service request 195 can indicate various types of information. For example, the vehicle service request 194 can indicate the type of vehicle service that is desired (e.g., a transportation service, a delivery service, a courier service, etc.), one or more locations (e.g., an origin location, a destination location, etc.), timing constraints (e.g., pick-up time, drop-off time, deadlines, etc.), and/or geographic constraints (e.g., to stay within a certain area, etc.). The service request 195 can indicate a type/size/class of vehicle such as, for example, a sedan, an SUV, luxury vehicle, standard vehicle, etc. The service request 195 can indicate a product of the service entity 185. For example, the service request 195 can indicate that the user is requesting a transportation pool product by which the user would potentially share the vehicle (and costs) with other users/items. In some implementations, the service request 195 can explicitly request for the vehicle service to be provided by an autonomous vehicle or a human-driven vehicle. In some implementations, the service request 195 can indicate a number of users that will be riding in the vehicle/utilizing the vehicle service. In some implementations, the service request 195 can indicate preferences/special accommodations of an associated user (e.g., music preferences, climate preferences, wheelchair accessibility, etc.) and/or other information.

The operations computing system 190A of the service entity 185 can process the data indicative of the vehicle service request 195 and generate a vehicle service assignment that is associated with the vehicle service request. The operations computing system can identify one or more vehicles that may be able to perform the requested vehicle services to the user 195. The operations computing system 190A can identify which modes of transportation are available to a user for the requested vehicle service (e.g., light electric vehicles, human-drive vehicles, autonomous vehicles, aerial vehicle, etc.) and/or the number of transportation modes/legs of a potential itinerary of the user for completing the vehicle service (e.g., single or plurality of modes, single or plurality of legs, etc.). For example, the operations computing system 190A can determined which autonomous vehicle(s) are online with the service entity 185 (e.g., available for a vehicle service assignment, addressing a vehicle service assignment, etc.) to help identify which autonomous vehicle(s) would be able to provide the vehicle service.

The operations computing system 190A and/or the vehicle computing system 110 can communicate with one or more other computing systems 190B that are remote from the vehicle 105. This can include, for example, computing systems associated with government functions (e.g., emergency services, regulatory bodies, etc.), computing systems associated with vehicle providers other than the service entity, computing systems of other vehicles (e.g., other autonomous vehicles, aerial vehicles, etc.). Communication with the other computing systems 190B can occur via the network(s) 120.

Figure 2:
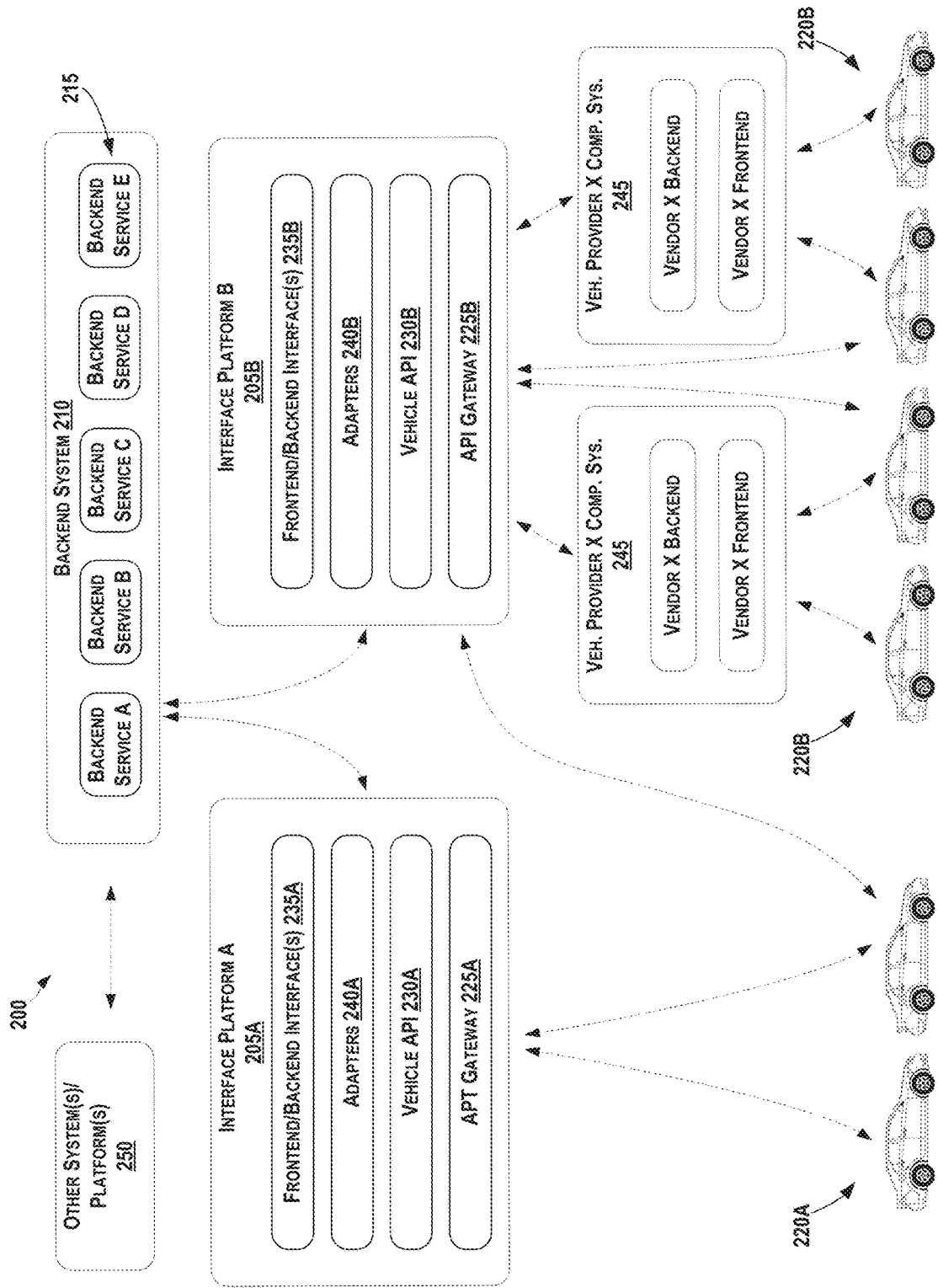
FIG. 2 depicts an example infrastructure system according to example embodiments of the present disclosure.

FIG. 2 depicts an example service infrastructure 200 according to example embodiments of the present disclosure. The service infrastructure 200 can include one or more systems, interfaces, and/or other components that can be included in an operations computing systems of the service entity for coordinating vehicle services and managing/supporting the autonomous vehicle associated therewith. The service infrastructure 200 can represent, for example, the architecture of a service platform of the operations computing system for coordinating and providing one or more vehicle services (e.g., via autonomous vehicle(s), etc.).

The service infrastructure 200 of an operations computing system can include a first application programming interface platform 205A, a second application programming interface application platform 205B, and/or a backend system 210 with one or a plurality of backend services 215. These components can allow the service infrastructure 200 (e.g., the operations computing system) to communicate with one or more autonomous vehicles and/or one or more other systems.

The first application programming interface platform 205A can facilitate communication with one or more autonomous vehicles of the service entity. For example, as described herein, the service entity may own, lease, etc. a fleet of autonomous vehicles 220A that can be managed by the service entity (e.g., its backend services) to provide one or more vehicle services. The autonomous vehicle(s) 220A can utilized by the service entity to provide the vehicle service(s) and can be included in the fleet of the service entity. Such autonomous vehicle(s) may be referred to as "service entity autonomous vehicles" or "first party autonomous vehicles."

The first application programming interface platform 205A can include a number of components to help facilitate the support, coordination, and management of the first party autonomous vehicles 220A associated with the service entity. The first application programming interface platform 205A (e.g., a private platform, etc.) can provide access to one or more backend services 215 that are available to the first party autonomous vehicles 220A. To help do so, the first application programming interface platform 205A can include a first API gateway 225A. The first API gateway 225A can function as a proxy for application programming interface (API) calls and can help to return an associated response. The first API gateway 225A can help provide other support functions for the service infrastructure 200 such as, for example, authentication functions, etc.

The first application programming interface platform 205A can include one or more APIs such as, for example, a first vehicle API 230A. The vehicle API 230A can include a library and/or parameters for facilitating communications between the first party autonomous vehicles 225A and the backend service(s) 215 of the backend system 210. For example, the first vehicle API 230A can be called by a first party autonomous vehicle 220A and/or another system to help communicate a data, messages, etc. to and/or from an autonomous vehicle. The first vehicle API 230A can provide for communicating such information in a secure, bidirectional manner that allows for expanded processing of data offboard a vehicle, analyzing such data in real time, and/or the like.

The first application programming interface platform 205A can include first frontend/backend interface(s) 235A. Each first frontend/backend interface 235A can be associated with a backend service 215 of the backend system 210. The first frontend/backend interface(s) 235A can serve as interface(s) for one client (e.g., an external client such as a first party autonomous vehicle 220A) to provide data to another client (e.g., a backend service 215). In this way, the frontend/backend interface(s) 235A can be external facing edge(s) of the first application programing interface platform 205A that are responsible for providing secure tunnel(s) for first party autonomous vehicles 220A (and/or other systems) to communicate with the backend system 215 (and vice versa) so that a particular backend service can be utilized with a particular first party autonomous vehicle 220A.

In some implementations, the first application programing interface platform 205A can include one or more first adapters 240A, for example, to provide compatibility between one or more first frontend/backend interfaces 235A and one or more of the API(s) associated with the first application programming interface platform 205A (e.g., vehicle API 230A). The first adapter(s) 240A can provide upstream and/or downstream separation between particular infrastructure components, provide or assist with data curation, flow normalization and/or consolidation, etc.

The second application programming interface platform 205B (e.g., a public platform, etc.) can facilitate communication with one or more autonomous vehicles of a third party vehicle provider. As described herein, a third party vehicle provider can be an entity that makes one or more of its autonomous vehicles available to the service entity for the provision of vehicle services. This can include, for example, an individual, an original equipment manufacturer (OEM), a third party vendor, or another entity that puts its autonomous vehicle(s) online with the service platform of the service entity such that the autonomous vehicle(s) can provide vehicle services of the service entity. These autonomous vehicles may be referred to as "third party autonomous vehicles" and are shown in FIG. 2 as third party autonomous vehicles 220B. Even though such autonomous vehicles may not be included in the fleet of autonomous vehicles of the service entity, the service infrastructure 200 (e.g., of the service entity's service platform, etc.) can allow the third party autonomous vehicles 220B to still be utilized to provide the vehicle services offered by the service entity, access the backend system 210, etc.

The second application programming interface platform 205B can allow the service platform to communicate directly or indirectly with autonomous vehicle(s). In some implementations, a third party autonomous vehicle 220B may call an API of, send data/message(s) to, receive data/message(s) from/directly through, etc. the second application programming interface platform 205B.

Additionally, or alternatively, another computing system can serve as an intermediary between the third party autonomous vehicles 220B and the second application programming interface platform 205B (and the service platform associated therewith). For example, the service infrastructure 200 can be associated with and/or in communication with one or more third party vehicle provider computing systems 245, such as a vehicle provider X computing system and a vehicle provider Y computing system. Each third party vehicle provider X, Y can have its own, separate third party autonomous fleet including respective third party autonomous vehicles 220B. The third party vehicle provider computing systems 245 can be distinct and remote from the service infrastructure 200 and provide for management of vehicles associated with that particular third party vehicle provider. As shown in FIG. 2, a third party vehicle provider computing system 245 can include its own backends and/or frontends for communicating with other systems (e.g., third party autonomous vehicle(s) 220B, operations computing system, etc.).

The third party computing system 245 associated with a particular third party autonomous vehicle fleet can serve as the communication intermediary for that fleet. For example, third party autonomous vehicles 220B associated with third party vehicle provider X can communicate with the third party vehicle provider X computing system which can then communicate with the service infrastructure 200 (e.g., to access the available backend services 215) via the second application programming interface platform 205B. Data from the service infrastructure 230 (e.g., the backend services) can be communicated to the vehicle provider X computing system (e.g., via the second application programming interface platform 235B) and then to the third party autonomous vehicles 220B associated with third party vehicle provider X. In another example, third party autonomous vehicles 220B associated with third party vehicle provider Y can communicate with the third party vehicle provider Y computing system which can then communicate with the service infrastructure 200 (e.g., to access the available backend services 215) via the second application programming interface platform 205B. Data from the service infrastructure 200 (e.g., the backend services 215) can be communicated to the third party vehicle provider Y computing system (e.g., via the second application programming interface platform 205B) and then to the third party autonomous vehicles 220B associated with third party vehicle provider Y.

The second application programming interface platform 205B can include a number of components to help facilitate the support, coordination, and management of the third party autonomous vehicles 220B associated with the third party vehicle providers. The second application programming interface platform 205B can provide access to one or more backend services 215 that are available to the third party autonomous vehicles 220B. To help do so, the second application programming interface platform 205B can include a second API gateway 225B. The second API gateway 225B can function as a proxy for application programming interface (API) calls and can help to return an associated response. The second API gateway 225B can help provide other support functions for the service infrastructure 200 such as, for example, authentication functions, etc.

The second application programming interface platform 205B can include one or more APIs such as, for example, a second vehicle API 230B. The second vehicle API 230B can include a library and/or parameters for facilitating communications between the third party autonomous vehicles 220B and the backend service(s) 215 of the backend system 210. For example, the second vehicle API 230B can be called by a third party autonomous vehicle 220B and/or another system (e.g., a third party vehicle provider computing system 245, etc.) to help communicate a data, messages, etc. to and/or from an autonomous vehicle. The second vehicle API 230B can provide for communicating such information in a secure, bidirectional manner.

The second application programming interface platform 205B can include second frontend/backend interface(s) 235B. Each of the second frontend/backend interface(s) 235B can be associated with a backend service 915 of the backend system 210. The second frontend/backend interface(s) 235B can serve as interface(s) for one client (e.g., an external client such as a third party autonomous vehicle 220B, a third party vehicle provider computing system 245) to provide data to another client (e.g., a backend service 215). In this way, the second frontend/backend interface(s) 235B can be external facing edge(s) of the second application programing interface platform 205B that are responsible for providing secure tunnel(s) for third party autonomous vehicles 220B (and/or other intermediary systems) to communicate with the backend system 210 (and vice versa) so that a particular backend service 215 can be utilized. In some implementations, the second application programing interface platform 205B can include one or more second adapters 240B, for example, to provide compatibility between one or more second frontend/backend interfaces 235B and one or more of the API(s) associated with the second application programming interface platform 205B (e.g., vehicle API 230B).

In some implementations, the first party autonomous vehicles 220A can utilize the second application programming interface platform 205B to access/communicate with the service platform/backend service(s) 215. This can allow for greater accessibility and/or back-up communication options for the first party autonomous vehicles 220BA.

The backend system 210 can host, store, execute, etc. one or more backend services 215. The backend service(s) 215 can be implemented by system client(s), which can include hardware and/or software that is remote from the autonomous vehicles and that provide a particular service to an autonomous vehicle. The backend service(s) 215 can include a variety of services that help coordinate the provision of vehicle service(s) and support the autonomous vehicles performing/providing those vehicle service(s) and/or the third party vehicle providers.

For example, the backend service(s) 215 can include a matching service that is configured to match an autonomous vehicle and/or an autonomous vehicle fleet with a service request for vehicle services. Based on a match, the matching service can generate and communicate data indicative of a candidate vehicle service assignment (indicative of the requested vehicle service) for one or more autonomous vehicles. In some implementations (e.g., for first party autonomous vehicle(s) 220A), the candidate vehicle service assignment can include a command that a first party autonomous vehicle 220A is required to accept, unless it would be unable to safely or fully perform the vehicle service. In some implementations (e.g., for third party autonomous vehicle(s) 220B), the candidate vehicle service assignment can include a request or offer for one or more autonomous vehicles to provide the vehicle service. This can be sent to one or more third party vehicle provider computing systems 245 and/or to one or more autonomous vehicle(s) 220B. The candidate vehicle service assignment can be accepted or rejected. If accepted, an autonomous vehicle 220A, 220B can be associated with that vehicle service assignment. The vehicle service assignment can include data indicative of the user, a route, an origin location for the vehicle service, a destination service for the vehicle service, service parameters (e.g., time restraints, user accommodations/preferences, etc.) and/or other information.

The backend service(s) 915 can include an itinerary service. The itinerary service can maintain, update, track, etc. a data structure that is indicative of task(s) or candidate task(s) that are (or can be) associated with a particular autonomous vehicle, autonomous vehicle fleet, and/or vehicle provider. The tasks can include, for example, vehicle service assignments for providing vehicle services and/or tasks associated with an activity other than the performance of a vehicle service. For example, the tasks can include: a testing task (e.g., for testing and validating autonomy software, hardware, etc.); a data acquisition task (e.g., acquiring sensor data associated with certain travel ways, etc.); a re-positioning task (e.g., for moving an idle vehicle between vehicle service assignments, etc.); a circling task (e.g., for travelling within the current geographic area in which it is located (e.g., circle the block or neighborhood), etc.); a maintenance task (e.g., for instructing travel to a service depot to receive maintenance, etc.); a re-fueling task; a vehicle assistance task (e.g., where an vehicle travels to assist another vehicle, etc.); a deactivation task (e.g., going offline, etc.); a parking task; and/or other types of tasks. The itinerary service can maintain an itinerary for an autonomous vehicle, fleet, vehicle provider, etc. The itinerary can serve as a queue for the various tasks. In some implementations, the tasks can be associated with a priority or order for which they are deployed to an autonomous vehicle, fleet, vehicle provider, etc.

In some implementations, the vehicle service assignment can be associated with a multi-modal vehicle service. For example, the user may request and/or be provided a multi-modal user itinerary by which the user is to travel to the user's ultimate destination via two or more types of transportation modalities (e.g., ground based vehicle, aerial vehicle, public transit, etc.). As such, the origin location and/or destination location identified in the vehicle service assignment may include intermediate locations (e.g., transfer points) along the user's multi-modal itinerary.

The backend service(s) 215 can include a deployment service that communicates tasks for an autonomous vehicle to complete. For example, the deployment service can communicate data indicative of a vehicle service assignment and/or another task to an autonomous vehicle (or an intermediary system). The deployment service can communicate such data to an autonomous vehicle (or an intermediary system) based at least in part on the itinerary associated therewith. By way of example, the highest priority task and/or the task that is next in order can be deployed.

The backend services 215 can include a routing service. The routing service can be configured to provide an autonomous vehicle with a route for a vehicle service and/or another task. The route can be based at least in part on factors associated with the geographic area in which the autonomous vehicle is (or will be) travelling (e.g., weather, traffic, events, etc.). Additionally, or alternatively, the route can be based at least in part the autonomy capabilities of the autonomous vehicle (e.g., ability to complete an unprotected left-hand turn, U-turn, etc.). In some implementations, the routing service can be configured to assign, coordinate, monitor, adjust, etc. one or more designated pick-up and/or drop-off zones for the vehicle service(s). The routing service can be available to first party autonomous vehicles 220A. The routing service can be available to third party autonomous vehicles 220B, if permitted/requested by the associated third party vehicle providers.

The backend services 215 can include a rider experience service. The rider experience service can be configured to communicate data to a rider associated with the vehicle service. This can include, for example, upcoming vehicle actions, routes, drop-off zones, user adjustable vehicle conditions (e.g., music, temperature, etc.). Such information can be presented via a display device of an onboard tablet, a user device of the user, etc. through a software application associated with the service entity.

The backend services 215 can include a remote assistance service. The remote assistance service can be configured to provide remote assistance to an autonomous vehicle and/or a user. For example, a remote assistance operator can take over control and/or assist an autonomous vehicle to traverse/detour around an unexpected obstruction in a travel way (e.g., a fallen tree, etc.). In another example, the remote assistance operator can communicate with the user (e.g., via the onboard tablet, use's phone, etc.) in the event that the user is in need of help.

The backend services 215 can include a simulation/testing system. The simulation/testing service can help facilitate vehicle provider integration with the service platform. For example, simulation/testing service can provide testing environments for vehicle providers to simulate communications and/or the performance of vehicle services using the service infrastructure 200.

The backend services 215 can include one or more other services. This can include, for example, payment services, vehicle rating services, health and maintenance services, software update/deployment services, and/or other services.

In some implementations, one or more backend services 215 that are available to the first party autonomous vehicles 220A (e.g., via the first application programming interface platform 205A) may not be available to the third party autonomous vehicles 220B (e.g., via the second application programming interface platform 205B), and vice versa. For example, a software update/deployment service for the first party autonomous vehicles 220A may not be accessible or suitable for a third party autonomous vehicle 220B that utilizes the onboard autonomy software of a third party vehicle provider (not the service entity). As such, a third party autonomous vehicle 220B and the software update/deployment backend service may not be able to communicate with one another.

In some implementations, the service infrastructure 200 can include a test platform for validating and vetting end-to-end platform functionality, without use of a real vehicle on the ground. For example, the test platform can simulate trips with human drivers and/or support fully simulated trip assignment and/or trip workflow capabilities. For example, the test platform can simulate and monitor data traffic through the service infrastructure 200 to ensure proper functioning. In some implementations, the testing platform can access the simulation/testing backend to help facilitate a test or simulation.

In some implementations, the service infrastructure 200 can utilize a plurality of software development kits (SDKs) that help provide access to the first and second application programming interface platforms 205A, 205B. All (or a portion of) external communication with the platforms can be done via the SDKs. For example, the SDKs can include a first SDK (e.g., private SDK) and a second SDK (e.g., public SDK) and specific endpoints to facilitate communication with the first and second application programming interface platforms 205A, 205B, respectively. In some embodiments, the first party autonomous vehicle(s) 245A (and/or a test platform) can use both the first and second SDKs, whereas the third party autonomous vehicles 245B and/or the third party vehicle provider computing systems 270 can use only the second SDK and associated endpoints. In some implementations, the SDKs can provide a single entry point, which can improve consistency across both the service provider fleet and the third party entity fleet(s). As an example, a second SDK can provide secured access to the second application interface platform 205B and access to capabilities such as vehicle service assignments, routing, and/or the like. The first SDK can be accessed by the first party autonomous vehicles 205A and provide access to capabilities including those available only to the first party autonomous vehicles 205A.

In some implementations, the SDKs can include a command-line interface to provide an entry point into the SDK components and act as a gateway for SDK related work, integration, testing, and authentication. For example, the command-line tools can provide for bootstrapping, managing authentication, updating SDK version, testing, debugging, and/or the like. In some implementations, a command-line interface can require an authentication certificate before being able to bootstrap an SDK, download components, and/or access a service entity's services. For example, based on the authentication certificate, a command-line interface can determine which version of the SDK to which to provide access. In some implementations, SDKs can be implemented onboard a first or third party autonomous vehicle 220A, 220B and/or a third party vehicle provider computing system 245.

In some implementations, the service infrastructure 200 can facilitate communication between the service platform and one or more other platforms 250 of the service entity/operations computing system. By way of example, the service entity may have (e.g., the operations computing system may include, etc.) one or more other platforms 250 that help indicate what services/vehicles are available to a user, coordinate the provision of vehicle services by human-driven vehicles, that are specifically associated with certain types of services (e.g., delivery services, aerial transport services, etc.). The other platform(s) 250 may communicate with the service platform utilizing the service infrastructure 200 to determine, for example, whether any autonomous vehicles would be available to the user for any potential vehicle services. The other platform(s) can perform any and/or all of the operations and functions of the operations computing system (implementing the service infrastructure 200) as described herein. For example, the other platform(s) 250 can perform any of the filter and/or user/vehicle matching operations and send vehicle recommendations to the service platform (that uses the service infrastructure 200) for communication with the appropriate vehicles and/or vehicle providers. Additionally, or alternatively, the other platform(s) 250 can provide filtering recommendations (e.g., suggested user features, vehicle fleet features, etc.) for another platform to consider.

Figure 3:
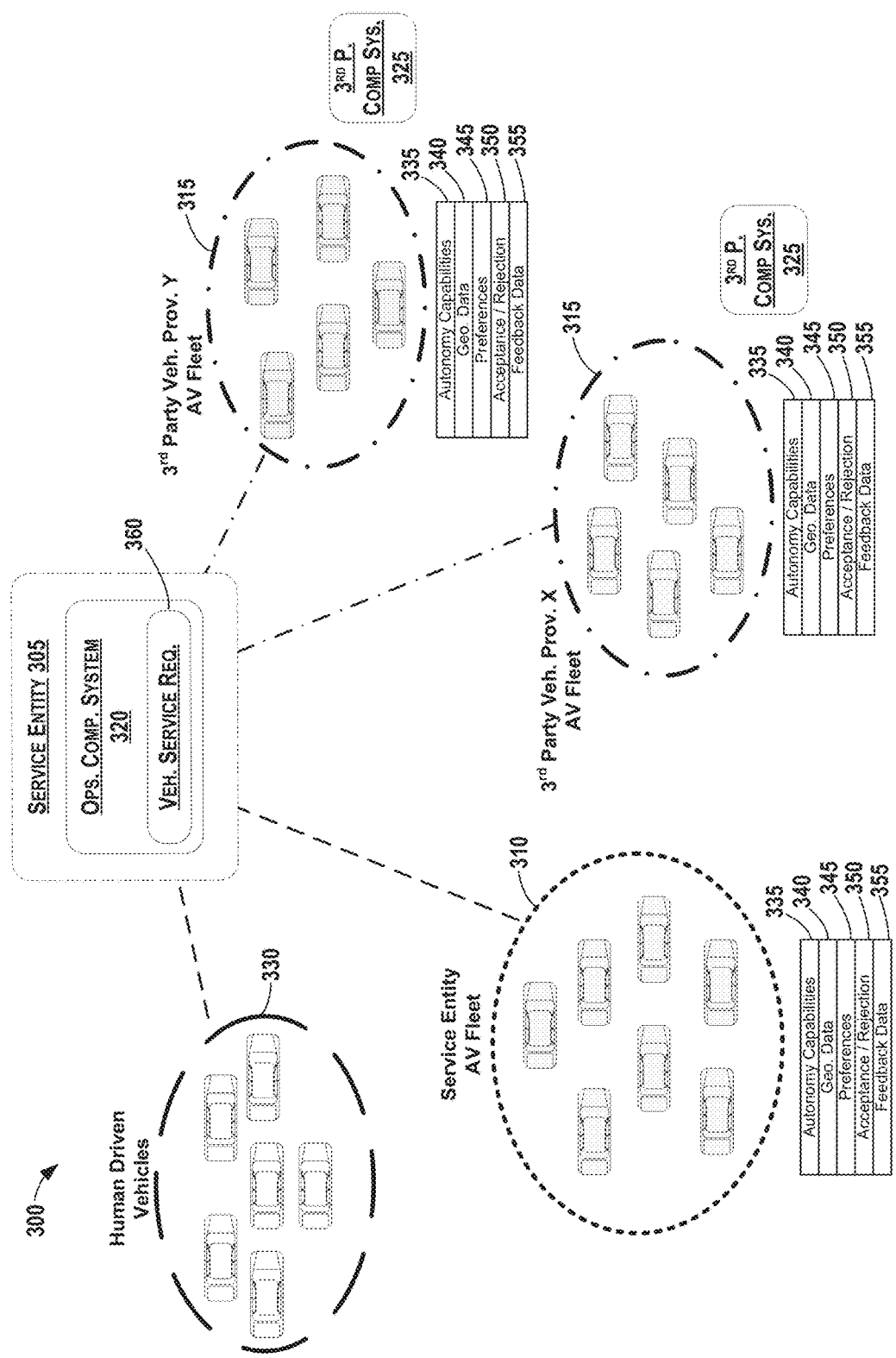
FIG. 3 depicts example autonomous vehicle fleets according to example embodiments of the present disclosure.

FIG. 3 depicts an example ecosystem 300 of vehicles according to example embodiments of the present disclosure. The ecosystem 300 can include vehicles associated with one or more vehicle providers including, for example, a service entity 305, a third party vehicle provider, an individual (e.g., owning/leasing a human driven vehicle, etc.), etc. A service entity 305 can utilize a plurality of autonomous vehicles including, but not limited to, service entity/first party autonomous vehicles 310 and/or third party autonomous vehicles 315 (e.g., third party vehicle provider X autonomous vehicles, third party vehicle provider Y autonomous vehicles, etc.) to provide vehicle services. An autonomous vehicle 310, 315 can be included in one or more fleets. A fleet can include one or a plurality of autonomous vehicles. The service entity 305 can be associated with a first computing system such as, for example, an operations computing system 320 (e.g., implementing the service infrastructure 200, service platform, etc.). The operations computing system 320 of the service entity 305 can help coordinate, support, manage, facilitate, etc. the provision of vehicle service(s) by the autonomous vehicles 310, 315. The service entity 305, autonomous vehicles 310, 315, and operations computing system 320 can include/represent the service entities, autonomous vehicles, and operations computing systems, respectively, discussed with reference to one or more other figures described herein.

Each third party vehicle provider (e.g., vehicle provider X, vehicle provider Y, etc.) can be associated with a respective second computing system such as, for example, a third party computing system 325. The third party computing system 325 can be configured to manage the third party autonomous vehicles 315 (e.g., of the associated fleet, etc.). A third party computing system 325 can manage the vehicle service assignments, other vehicle tasks, dispatch, maintenance, online/offline status, etc. of its associated third party autonomous vehicles 315. Each third party autonomous vehicle 315 (or fleet of third party autonomous vehicles) can communicate with the operations computing system 310 of the service entity 305 directly and/or indirectly via a respective third party computing system 325, as described herein. The third party computing systems 325 can include/represent the third party computing systems discussed with reference to one or more other figures.

In some implementations, the service entity 305 can utilize human driven vehicles 330 for providing vehicle services for the service entity 305. For example, the operations computing system 320 can determine if a vehicle service would be better suited and/or preferable for a human driven vehicle 330 in comparison to an autonomous vehicle 310, 315.

A service entity 305 may have varying levels of control over the vehicle(s) that perform its vehicle services. In some implementations, a vehicle can be included in the service entity's dedicated supply of vehicles. The dedicated supply can include vehicles that are owned, leased, or otherwise exclusively available to the service entity (e.g., for the provision of its vehicle service(s), other tasks, etc.) for at least some period of time. This can include, for example, the first party autonomous vehicles 310. Additionally, or alternatively, this can include a third party autonomous vehicle 315 that is associated with a third party vehicle provider, but that is online only with that service entity (e.g., available to accept vehicle service assignments for only that service entity, etc.) for a certain time period (e.g., a few hours, a day, week, etc.).

In some implementations, a vehicle can be included in the service entity's non-dedicated supply of vehicles. This can include vehicles that are not exclusively available to the service entity 305. For example, a third party autonomous vehicle 315 that is currently online with two different service entities (e.g., concurrently online with a first service entity and a second service entity, etc.) so that the autonomous vehicle 315 may accept vehicle service assignment(s) from either service entity, may be considered to be part of a non-dedicated supply of vehicles. In some implementations, whether a vehicle is considered to be part of the dedicated supply or the non-dedicated supply can be based, for example, on an agreement between the service entity 305 and a third party vehicle provider associated with that vehicle.

The operations computing system 320 can determine which autonomous vehicles are available for a vehicle service/vehicle service request. In some implementations, the available autonomous vehicles can include those that are currently online with the service entity 305 (e.g., actively engaged, logged in, etc. to a service platform/service entity infrastructure 200, etc.) and are not currently engaged in performance of a vehicle service, performance of a maintenance operation, and/or another task. In some implementations, the operations computing system 320 can determine the availability of an autonomous vehicle 310, 315 based at least in part on data indicating that the autonomous vehicle 310, 315 is online, ready to provide a vehicle service, etc. This can include, for example, data communicated directly from an autonomous vehicle 310, 315 and/or from another computing system (e.g., a third party computing system 325, etc.). In some implementations, the operations computing system 320 can monitor an autonomous vehicle 310, 315 (e.g., its progress along a route, when it comes online, etc.) to help determine whether the autonomous vehicle 310, 315 may be available to service a vehicle service request.

As described herein, each autonomous vehicle 310, 315 that is online with the service entity 301 can be associated with an itinerary. The itinerary can be a data structure (e.g., a list, table, tree, queue, etc.) that is stored and accessible via a backend service of the service infrastructure 200 (e.g., an itinerary service, etc.). The itinerary can include a sequence of tasks for the autonomous vehicle. In some implementations, the operations computing system 320 can determine that a vehicle is (or is not) available to provide a vehicle service based at least in part on an associated itinerary.

The operations computing system 320 of the service entity 305 can obtain data indicative of one or more operational capabilities of an autonomous vehicle 310, 315. The operational capabilities can describe the autonomy capabilities 335 of the autonomous vehicles 310, 315 (and/or its associated fleet), geographic data 340 associated with autonomous vehicles 310, 315 (and/or its associated fleet), and/or other information. The autonomy capabilities 335 can be indicative of the capabilities of the autonomous vehicle to autonomously navigate/operate (e.g., while in a fully autonomous mode), the restrictions of an autonomous vehicle 310, 315, scenarios in which the autonomous vehicle 310, 315 can/cannot operate, and/or other information descriptive of how an autonomous vehicle 310, 315 can or cannot autonomously operate. For instance, the autonomy capabilities 335 can indicate one or more vehicle motion maneuvers that an autonomous vehicle 310, 315 can or cannot autonomously perform (e.g., without human input, while in a fully autonomous mode). By way of example, the autonomy capabilities 335 can indicate whether the autonomous vehicle(s) 310, 315 in a particular fleet can perform a U-turn and/or whether the autonomous vehicle(s) 310, 315 are restricted from performing an unprotected left turn. In another example, the autonomy capabilities 335 can indicate that an autonomous vehicle 310, 315 is capable of operating in a respective traffic area (e.g., a high traffic area such as an urban setting, a minimal traffic area such as a rural setting, etc.) and/or one or a plurality of geographic fences/boundaries identifying where the autonomous vehicle can travel (e.g., based on the map data available to the autonomous vehicle, vehicle provider preferences, etc.). The geographic data 340 can be indicative of the past, present, and/or future location(s) of an autonomous vehicle 310, 315 (e.g., when/where it is available to provide a vehicle service, to be used for re-positioning, etc.).

The technology of the present disclosure can improve the efficiency and effectiveness of the operations computing system 320 as well as the autonomous vehicles 310, 315 by selectively matching users with autonomous vehicle fleets. To help do so, the operations computing system 320 (a first computing system) can obtain data indicative of one or more vehicle fleet features associated with one or a plurality of autonomous vehicle fleets. The vehicle fleet features can provide information about the autonomous vehicle fleet, the autonomous vehicles in the respective fleet, and/or the vehicle provider associated with the respective fleet. The vehicle fleet features can indicate one or more vehicle provider preferences 345. This can include preferences of the service entity 305 and/or a third party vehicle provider. The vehicle provider preferences 345 can indicate, for example, one or more characteristics that the vehicle provider prefers for a user that is to ride in/utilize an autonomous vehicle of the vehicle provider's fleet.

Figure 4A:
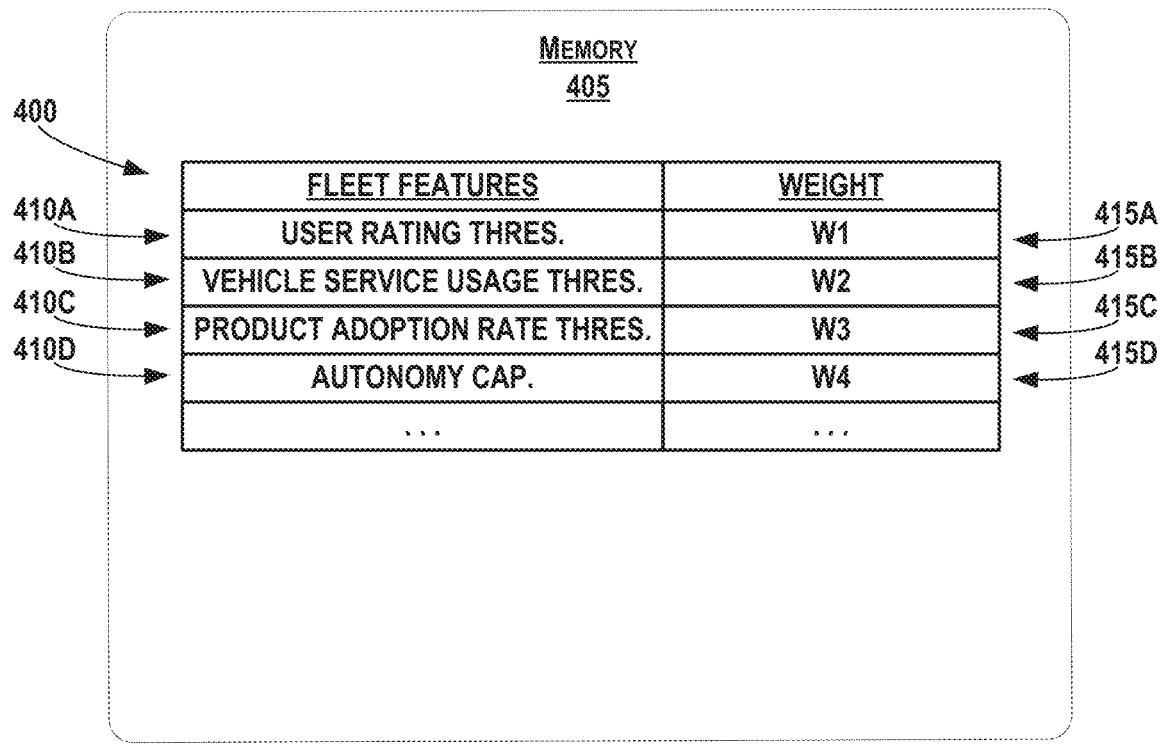
FIGS. 4A-B depicts an example data structures with features according to example embodiments of the present disclosure.

For example, with reference to FIG. 4A, the operations computing system 320 can obtain data indicative of one or more vehicle fleet features 400 (e.g., stored in memory 405, etc.) associated with each of a plurality of candidate autonomous vehicle fleets. The vehicle fleet features 400 (e.g., the vehicle provider preference(s) 345, etc.) can include a user rating threshold 410A (e.g., a minimum rating associated with a user of the service entity, etc.) and/or a vehicle service usage threshold 410B (e.g., a minimum number of transportation services completed by a user, etc.). Additionally, or alternatively, the vehicle fleet features 400 (e.g., the vehicle provider preference(s) 345, etc.) can include a product adoption rate threshold 410C. The product adoption rate threshold 410C can indicate a threshold time (e.g., days, weeks, etc.) by which a user historically adopts new products/services offered by the service entity 305. This can be helpful to show, for example, that the user is open to newer technology such as the provision of vehicle services by autonomous vehicles.

A vehicle provider preference 345 can be a soft preference (e.g., a desire/suggestions that is not required for every user) or a hard preference (e.g., a requirement that must be met by the user in order to be matched to the autonomous vehicle fleet). In this way, the vehicle provider can generate "whitelists" of users for its autonomous vehicle fleet.

The vehicle fleet feature(s) 400 associated with a respective candidate autonomous vehicle fleet can include the autonomy capabilities 410D of the respective autonomous vehicle fleet. This can be/include the autonomy capabilities 335 described with reference to FIG. 3.

The operations computing system 305 can obtain the vehicle fleet feature(s) 400 in a variety of manners. In some implementations, the operations computing system 305 can obtain data indicative of the vehicle fleet feature(s) 400 via a portal of a service platform that is accessible by a third party vehicle provider. In some implementations, the vehicle provider can communicate the vehicle fleet feature(s) 400 via service level agreement(s) or other avenues outside the portal. In some implementations, the operations computing system 305 can include one or more systems or models (e.g., machine-learned model(s)) that can learn the vehicle fleet feature(s) 400 over time. For example, the operations computing system 305 can calculate the vehicle service assignment acceptance rate of a third party vehicle provider (over time) to learn that the third party vehicle provider (and its fleet) only accepts vehicle service assignments for users above a certain user rating threshold 410A. In another example, the operations computing system 305 can predict the autonomy capabilities 335 of a third party autonomous vehicle 315 by evaluating the routes traversed by, the maneuvers made by, etc. the third party autonomous vehicle 315 while performing vehicle services. The vehicle fleet feature(s) 400 for each autonomous vehicle fleet can be stored in an accessible database (e.g., with memory 405, etc.) and can be updated over time.

Figure 4B:
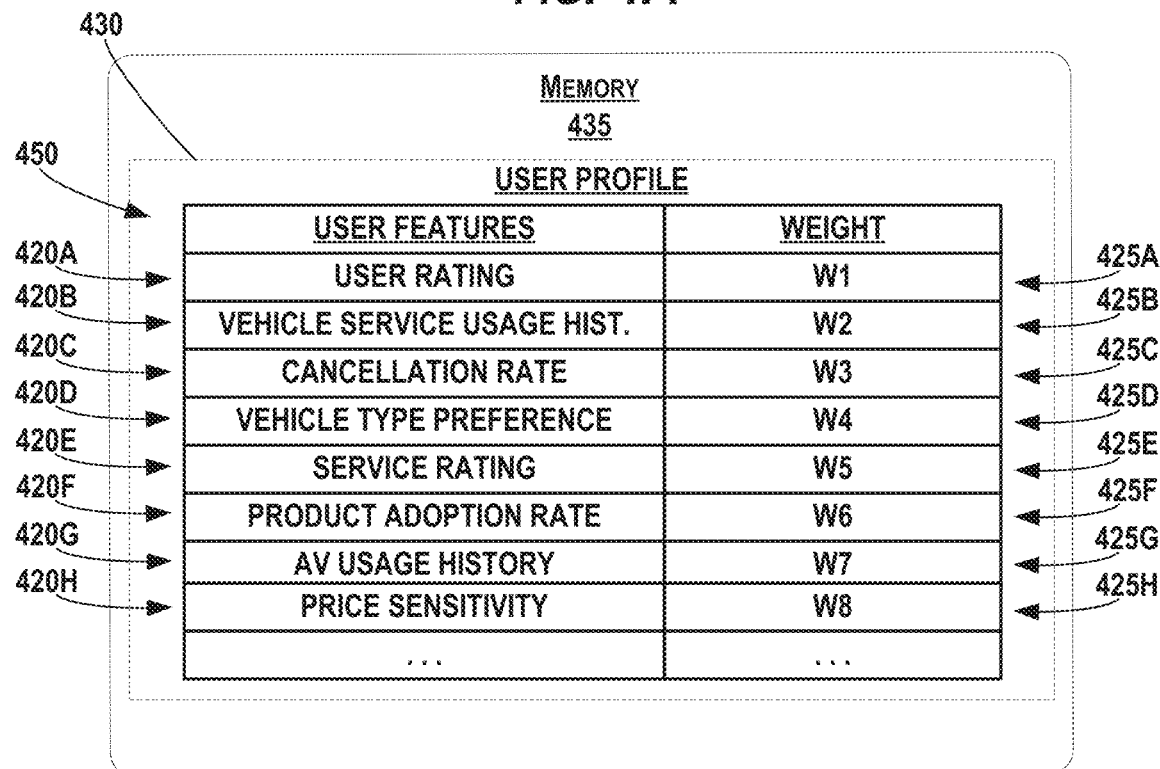

As described herein, the operations computing system 320 can obtain data indicative of a vehicle service request 360 associated with a user (shown in FIG. 3). The operations computing system 320 can determine data indicative of user features associated with the user. For example, with reference to FIG. 4B, the operations computing system 320 can determine, via a user profile 430, data indicative of one or more user features 450 associated with the user. The operations computing system 320 can identify the user profile 430 and/or user feature(s) 450 based at least in part on the vehicle service request 360. For example, the operations computing system 320 can utilize an identifier associated with the user and/or the user's account/profile to look-up the user profile 430 and/or the user feature(s) 450 associated with the user in an accessible database (e.g., with memory 435 storing the user profile 430, etc.). The user feature(s) 450 can be stored in a data structure that allows for such retrieval/storage. For example, the user feature(s) 450 can be stored in and/or with the user profile 430 of the user that can be accessed/retrieved by the operations computing system 320. The user profile 430 can be maintained by the service entity 305 and include various information about the user such as, for example, the user feature(s) 450. The user profile 430 can include other information such as, for example, payment information, security credentials, etc.

The user features 450 can include a variety of information. The user features 450 can include, for example, a user rating 420A associated with the user. The user rating 420A can be indicative of a rating and/or an aggregate of a plurality of ratings of the user's behavior with respect to the vehicle services of the service entity 305. Such ratings can be provided by others associated with the vehicle service. For example, a human driver of a human-driven vehicle can rate the user after transporting the user for a user transportation service. In another example, a vehicle provider (and/or an autonomous vehicle) can rate the user after transporting the user in an autonomous vehicle for a user transportation service.

The user feature(s) 450 can include a vehicle service usage history 420B associated with the user. The vehicle service usage history 420B can indicate the number of vehicle services (and type) that the user has taken/completed with the service entity 305. This can include, for example, a number of times the user has been previously transported by a human-driven vehicle and/or an autonomous vehicle for a requested vehicle service.

The user feature(s) 450 can include a cancellation rate 420C associated with the user. The cancellation rate 420C can indicate when and how often (e.g., frequency, ratio, percentage, etc.) the user cancels a vehicle service request. The cancellation rate 420C can also indicate the circumstances associated with the cancellation. For example, the cancellation rate 420C can indicate the type of vehicle assigned to the vehicle service request that was cancelled (e.g., human-driven vehicle, autonomous vehicle, vehicle make/model, etc.), the estimated time of arrival associated with the vehicle service request that was cancelled, a route associated with the vehicle service request that was cancelled, etc.

In some implementations, the user(s) features 450 can include a vehicle type preference 420D associated with the user. The vehicle type preference 420D can indicate a type of vehicle that is preferred by the user (e.g., make, model, size, class, etc.).

In some implementations, the user feature(s) 450 can include a service rating 420E provided by the user for at least one previous vehicle service. The service rating 420E can be indicative of a level of satisfaction of the user with one or more previously requested vehicle services. For example, the user can provide a rating/feedback associated with a vehicle service after or during the provision of the vehicle service. A lower rating or negative feedback (e.g., negative reviews, comments, low tip, etc.) can be indicative of a lower level of satisfaction, while a higher rating or positive feedback (e.g., positive reviews, comments, high tip, etc.) can be indicative of a higher level of satisfaction. The service rating 420E can include an aggregate service rating (over a plurality of vehicle services) and/or a service rating associated with an individual vehicle service. The service rating 420E can include information indicative of the circumstances associated with a particular rating. For example, the service rating 420E associated with a vehicle service can be stored/associated with information that indicates the vehicle type, route, estimated/actual time of arrival, type of vehicle service, vehicle characteristics (e.g., make, model, size, class, etc.), and/or other information.

In some implementations, the user feature(s) 450 can include a product adoption rate 420F associated with the user. The product adoption rate 420F can indicate, for example, the rate, time frame (e.g., number of day(s), week(s), etc.), frequency, etc. at which a user tries and/or adopts (e.g., uses a plurality of times) a new product offered by the service entity 305. For example, the service entity 305 can offer a new aerial ridesharing/ride-hailing service. The product adoption rate 420F can indicate how many days passed from the initial product launch until the user utilized the aerial ridesharing/ride-hailing service. In another example, the product adoption rate 420F can indicate that the user tried and/or adopted a certain percentage/fraction of new products offered by the service entity 305 (e.g., over a certain time period). In another example, the product adoption rate 420F can indicate the rate at which new products were not tried/adopted by the user. In some implementations, the product adoption rate 420F can be indicative of the products tried/adopted by a user and the products not tried/adopted by the user.

In some implementations, the user feature(s) 450 can include an autonomous vehicle usage history 420G associated with the user. The autonomous vehicle usage history 420G can indicate a number of times, frequency, ratio, percentage, etc. that the user explicitly requested or utilized an autonomous vehicle for a vehicle service. The autonomous vehicle usage history 420G can also indicate which autonomous vehicles and/or autonomous vehicle fleets provided the vehicle service to the user.

The user feature(s) 450 can include one or more other features associated with the user. For example, the user feature(s) 450 can include a price sensitivity 420H of a user. The price sensitivity 420H can indicate how sensitive a user is to the price of vehicle services. For example, the user may launch an application of the service entity but forgo or cancel a vehicle service request based on a price of the vehicle service at the time. This user feature can be utilized for matching a user to an autonomous vehicle fleet that can minimize the cost associated with a vehicle service.

The operations computing system 320 can determine at least one selected autonomous vehicle fleet for the provision of a vehicle service based at least in part on one or more user features 450 and one or more fleet features 400 (e.g., autonomy capabilities 410D, etc.) of the at least one selected autonomous vehicle fleet. Determining the at least one selected autonomous vehicle fleet can include, for example, predicting how one or more autonomous vehicles of the at least one selected autonomous vehicle fleet will perform the vehicle service associated with the vehicle service request 360 based at least in part on the autonomy capabilities 410D of the at least one selected autonomous vehicle fleet.

Figure 5:
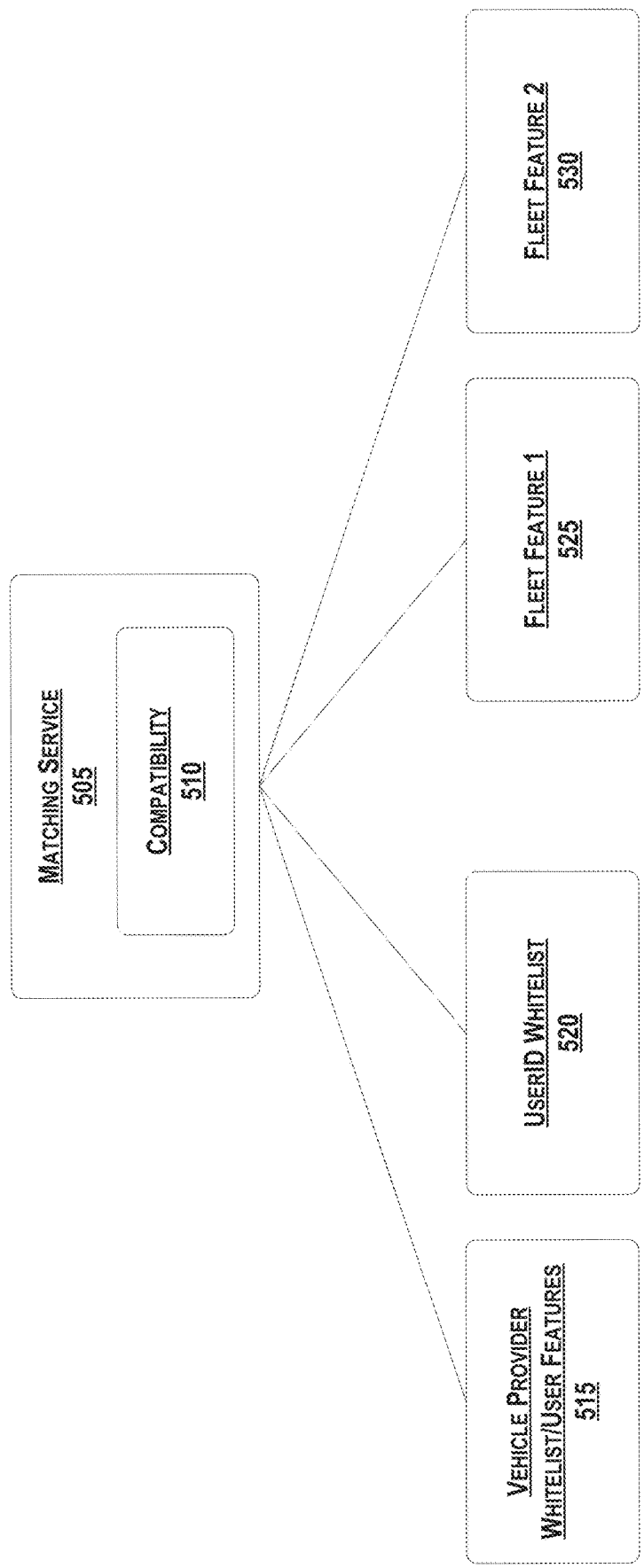
FIG. 5 depicts an example backend matching service according to example embodiments of the present disclosure.

To help do so, turning to FIG. 5, the operations computing system 320 (e.g., a matching service 505, etc.) can determine a compatibility 510 of the user and an autonomous vehicle fleet for the requested vehicle service. For instance, the operations computing system 320 can determine whether one or more autonomous vehicle fleets are compatible with the user based at least in part on the vehicle fleet features 400 of a respective autonomous vehicle fleet (e.g., vehicle provider preferences 345, autonomy capabilities 335 of the fleet's autonomous vehicle(s), etc.) and the user feature(s) 450. In some implementations, the matching service 505 of the operations computing system 320 can access vehicle provider whitelists 515 (e.g., identifying user features) and/or userID whitelists 520 (e.g., identifying users previously determined to be compatible, etc.) as well as fleet feature(s) 525, 530 that are important for determining compatibility with a particular fleet.

The user and an autonomous vehicle fleet can be considered compatible, for example, when it is predicted that the user and vehicle provider are suitable for one another, would be satisfied with the match, would be satisfied with the vehicle service assignment/vehicle service, etc. For instance, as described herein, determining the compatibility 510 can include predicting how one or more autonomous vehicles of an autonomous vehicle fleet will perform the vehicle service associated with the vehicle service request 360 based at least in part on the autonomy capabilities 410D. This can include utilizing the location(s) indicative in the vehicle service request and map data (of the relevant geographic area, etc.), along with the autonomy capabilities 410D of the fleet to estimate a route the autonomous vehicle(s) is predicted to traverse when performing the vehicle service (e.g., driving to a destination, etc.), one or more vehicle motion maneuvers the autonomous vehicle(s) may or may not perform (e.g., U-turns, protected left turns, etc.), estimated speed(s), estimated vehicle service durations, estimated pick-up/arrival time(s), etc. The compatibility 510 can be expressed as a compatibility score (as further described herein), a binary decision (e.g., compatible or incompatible), and/or in other manners.

The operations computing system 320 can determine compatibility 510 in a variety of manners. For example, the operations computing system 320 can utilize an algorithm that weighs the user feature(s) 450 and the vehicle fleet feature(s) 400. The algorithm can compare the user feature(s) 450 and the vehicle fleet feature(s) 400. The algorithm can calculate a compatibility score based on the user feature(s) 450 and/or the vehicle fleet feature(s) 400. The algorithm can utilize a scoring function that employs weights 415A-D, 425A-H (shown in FIG. 4B) to account for the effect of each feature on the scoring function. The weights 415A-D, 425A-H can be set based at least in part on input from a third party vehicle provider, the service entity 305, and/or a user. For example, in the event the third party vehicle provider's preference for a certain user rating threshold 410A is a hard preference (e.g., a requirement that must be met), the weight 415A for this user feature can be higher. In some implementations, the weights 415A-D, 425A-H can be set to a default (e.g., if no input is provided by a third party vehicle provider and/or user). In some implementations, the respective weights 415A-D, 425A-H associated with each feature can be adjusted over time as the operations computing system 320 matches users and autonomous vehicle fleets and learns what features may be more important for compatibility 510. In some implementations, the weights 415A-D, 425A-H can be different based at least in part on the geographic region in which the user is located and/or the vehicle service that is being offered (e.g., to reflect the specific preferences/practices of that region, etc.).

The operations computing system 320 can calculate the compatibility score by assigning a value to each of the user feature(s) 450 (e.g., a value for a user rating can reflect the actual user rating 420A) and to each of the vehicle fleet features(s) 400 (e.g., a value for a user rating threshold 410A can be the set threshold value), applying the respective weights 425A-H to each feature to obtain a weighted feature value for each feature, and aggregating the weighted feature values. The compatibility score can be the aggregation of the weighted feature values. The compatibly score can be expressed as a value, percentage, ratio, letter grade, and/or in other manners. In the event that the compatibility score is above a compatibility threshold, the operations computing system 320 can determine that the user and an autonomous vehicle fleet are compatible. In examples where such a threshold is utilized, the compatibility determination can be binary (e.g., compatibility 510 is "1" or "YES" or "COMPATIBLE" if above the threshold, compatibility 510 is "0" or "NO" or "INCOMPATIBLE" if below the threshold).

Additionally, or alternatively, the operations computing system 320 can utilize one or more machine-learned models to determine the compatibility 510 of a user and an autonomous vehicle fleet for a vehicle service request/vehicle service. For example, the one or more machine-learned models can be configured to determine compatibility 510 between a user and an autonomous vehicle fleet. The models can be or can otherwise include various machine-learned models such as neural networks (e.g., deep neural networks) or other multi-layer non-linear models. For example, the operations computing system 320 can include a machine-learned compatibility model. In some implementations, the machine-learned compatibility model can be a binary classifier model that indicatives whether a user and an autonomous vehicle fleet are compatible or incompatible.

The machine-learned compatibility model can be trained (e.g., via one or more machine-learning techniques such as back-propagation, etc.) to determine whether a user and one or more autonomous vehicle fleets are compatible based on user feature(s) 450 and/or vehicle fleet feature(s) 400. The training can include, for example, one or more supervised training techniques that use labeled training data. For instance, the machine-learned compatibility model can be trained over the labeled training data. The labeled training data can include annotations indicating a compatible user/fleet pair and/or an incompatible user/fleet pair.

By way of example, a training computing system can receive a training output descriptive of the model's classification of a user/fleet pair within the training data (e.g., whether the user and the autonomous vehicle fleet are compatible or not). The training computing system can analyze the training output to determine the accuracy of the machine-learned compatibility model. For instance, the training computing system can compare the output to the training data to determine whether the machine-learned compatibility model correctly identified the compatibility. If further training is required (e.g., to increase one or more confidence level(s), to increase accuracy, etc.), the training computing system can provide additional training data and/or indicate that adjustments may need to be made to the machine-learned compatibility model.

The operations computing system 320 can input data indicative of one or more user features 450 and/or one or more fleet features 400 into the trained machine-learned compatibility model. The machine-learned compatibility model can identify the user and an autonomous vehicle fleet associated with the user and fleet features 450, 400 as compatible or incompatible (e.g., based on predictive modeling, etc.). This can include, for example, predicting how an autonomous vehicle will perform the vehicle service associated with the vehicle service request based at least in part on the associated autonomy capabilities 410D (e.g., predicting a route to be traversed, vehicle motion maneuvers to be avoided/performed, etc.) and predicting whether the user will be satisfied with such a performance based at least in part on the user feature(s) 450. The operations computing system 320 can obtain, as an output of the machine-learned compatibility model, data indicating the compatibility 510 of the user and the autonomous vehicle fleet (e.g., whether the user and an autonomous vehicle fleet are compatible). In some implementations, the output can be indicative of a compatibility score. In some implementations, the output can be indicative of a confidence.

The operations computing system 320 can determine the compatibility 510 of the user with a plurality of autonomous vehicle fleets. In some implementations, the operations computing system can evaluate compatibility 510 for an autonomous vehicle fleet and stop when it determines that a first autonomous vehicle fleet is compatible with the user (and move on to matching the user/fleet). In the event that the operations computing system 320 determines that the user and the first autonomous vehicle fleet (e.g., vehicle provider X's fleet, etc.) are not compatible for the vehicle service, the operations computing system 320 can determine whether the user and a second autonomous vehicle fleet (e.g., vehicle provider Y's fleet, etc.) are compatible for the vehicle service. This can be done, for example, based at least in part on one or more autonomy capabilities 410D of the autonomous vehicle(s) within the second autonomous vehicle fleet and one or more of the user feature(s) 450.

In some implementations, the operations computing system 320 can evaluate a plurality of autonomous vehicle fleets before selecting one for the user. The operations computing system 320 can do so in an iterative manner to determine a compatibility score associated with each autonomous vehicle fleet. For example, operations computing system 320 can determine that the user is compatible with a first autonomous vehicle fleet, a second autonomous vehicle fleet, and a third autonomous vehicle fleet. The operations computing system 320 can determine a compatibility score for each of these autonomous vehicle fleets. The operations computing system 320 can rank the plurality of autonomous vehicle fleets in a priority order based at least in part on the compatibility score, as shown in ranking 600 of FIG. 6. The operations computing system 320 can select the autonomous vehicle fleet (e.g., the first autonomous vehicle fleet) with the highest compatibility score for the provision of the vehicle service for the user. This can allow the operations computing system 320 to have alternative fleet options, in the event the selected autonomous vehicle fleet (e.g., its vehicle provider, etc.) rejects the vehicle service request/vehicle service assignment.

The following provides some example circumstances that may affect the likelihood of determining that the user and an autonomous vehicle fleet are compatible (e.g., by improving/reducing a compatibility score).

In some implementations, the operations computing system 320 can determine the compatibility 510 of user and a first autonomous vehicle fleet based at least in part on one or more vehicle provider preferences 345 and the user feature(s) 450 associated with the user. For instance, the operations computing system 320 can determine that the user and the autonomous vehicle fleet may be compatible for the vehicle service based at least in part on at least one of the vehicle provider's user rating threshold 410A, vehicle service usage threshold 410B, or product adoption rate threshold 410C. By way of example, the operations computing system 320 can determine that the user rating 420A associated with the user is above the preferred user rating threshold 410A, that the user's vehicle service usage history 420B is above the preferred vehicle service usage threshold 410B, and/or that the user's product adoption rate 420G is above the preferred product adoption rate threshold 410C of the first autonomous vehicle fleet and/or its vehicle provider (e.g., vehicle provider X).

Additionally, or alternatively, the operations computing system 320 can determine the compatibility 510 of the user and a first autonomous vehicle fleet based at least in part on one or more autonomy capabilities 410D of the first autonomous vehicle fleet and the one or more user features 450. This can include determining the compatibility 510 based on a predicted satisfaction of the user.

Figure 7:
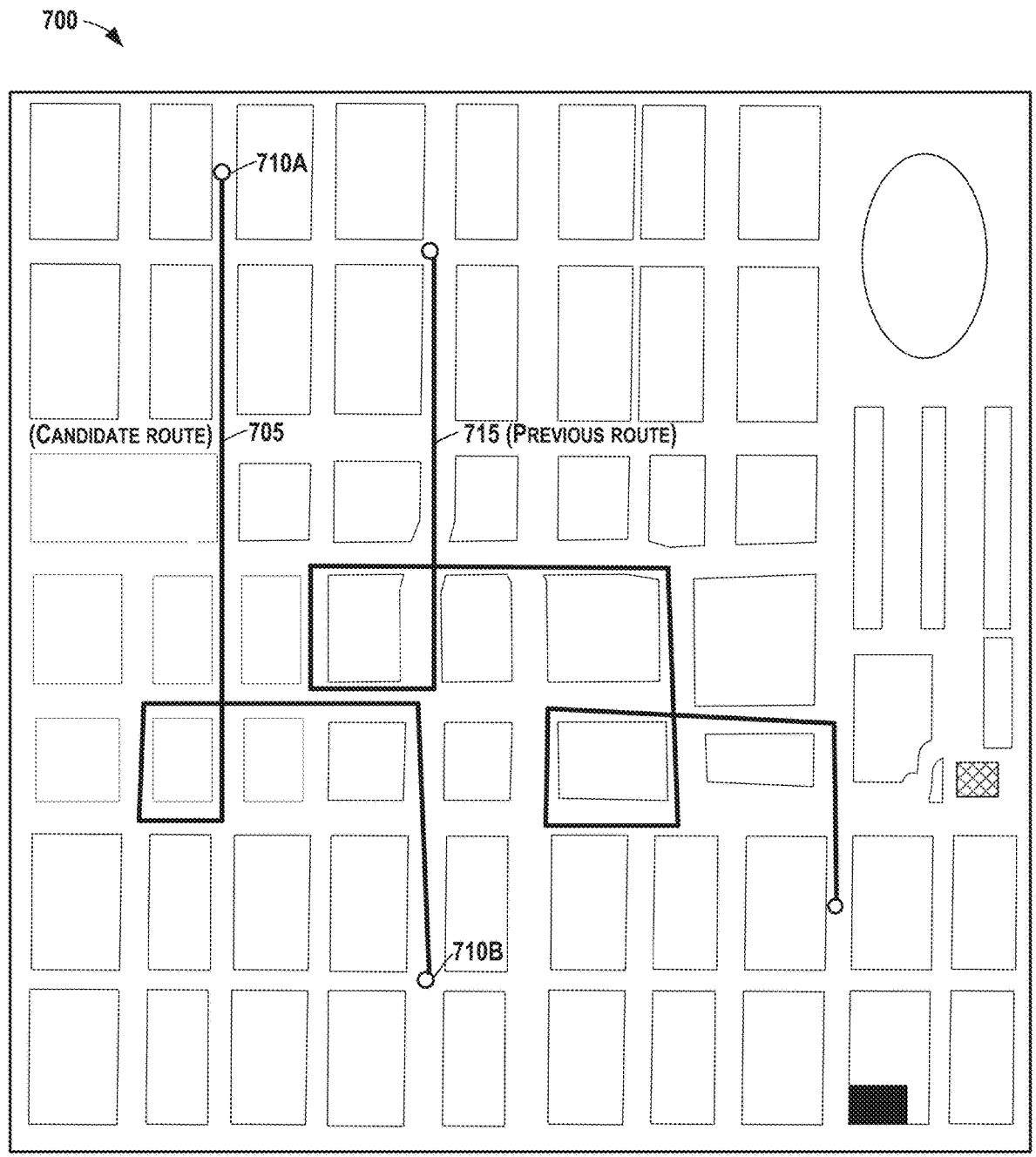
FIG. 7 depicts an example geographic area with routes according to example embodiments of the present disclosure.

By way of example, with reference to FIG. 7, the operations computing system 320 can predict the compatibility 510 of the user and an autonomous vehicle fleet based at least in part on the one or more autonomy capabilities 410D and a service rating 420E provided by the user for at least one previous vehicle service. The operations computing system 320 can determine a candidate route 705 (e.g., within a geographic area 700, etc.) from an origin location 710A to a destination location 710B for the one or more autonomous vehicles of the first autonomous vehicle fleet (e.g., vehicle provider X's fleet, etc.) based at least in part on the one or more autonomy capabilities 410D. The operations computing system 320 can predict that the user and the autonomous vehicle fleet are compatible based at least in part on the candidate route 705. The operations computing system 320 can predict a potential satisfaction of the user with the autonomous vehicle fleet based at least in part on the candidate route 705 and the one or more user features 450 (e.g., the service rating provided by the user).

By way of example, the operations computing system 320 can determine that in order to transport the user from the user's origin location 710A to a requested destination location 710B, an autonomous vehicle would likely take a candidate route 705 that omits taking U-turns and unprotected left turns because the vehicle's autonomy capabilities do not allow for such maneuvers. Using the service rating 420E for the user (e.g., stored with/in the user profile 430), the operations computing system 320 can determine that the user previously provided a high service rating and/or positive feedback for a previous vehicle service that was provided via a human-driven vehicle. In this example, the previous vehicle service included a route 715 that included no U-turns or unprotected left turns, although such maneuvers would have decreased the user's estimated and/or actual time of arrival. Thus, in this example, the operations computing system 320 can determine that the user and the autonomous vehicle fleet may be compatible at least because the user would likely be satisfied by the candidate route 705 likely to be traversed by the autonomous vehicle of that fleet providing the vehicle service.

Returning to FIGS. 3-5, in some implementations, the operations computing system 320 can determine the compatibility 510 of the user and a first autonomous vehicle fleet based at least in part on the one or more autonomy capabilities 410D and the cancellation rate 420C associated with the user. For example, the operations computing system 320 can determine an estimated time of arrival at a destination location (e.g., specified in the service request, etc.) based at least in part on the autonomy capabilities 410D of the first autonomous vehicle fleet (e.g., the autonomous vehicles 315 of vehicle provider X's fleet). This can be determined by using the fastest route available to a vehicle with such capabilities. The operations computing system 320 can obtain data indicative of the cancellation rate 420C associated with the user. The cancellation rate 420C can be associated with the user cancelling previous vehicle services provided by via human-driven vehicles. Based on the cancellation rate 420C, the operations computing system 320 can determine that the user does not have a tendency to cancel service requests with an estimate time of arrival similar to the one determined for the first autonomous vehicle (e.g. within a certain time range with respect to the origin/destination locations, time of day, etc.). The operations computing system 320 can determine that the user and the first autonomous vehicle fleet may be compatible for at least this reason.

Additionally, or alternatively, the operations computing system 320 can predict a willingness of the user to travel in an autonomous vehicle of the at least one selected autonomous vehicle fleet based at least in part on a product adoption rate 420G associated with the user. By way of example, the product adoption rate 420G may indicate that the user has a tendency to try and/or adopt new products offered by the service entity 305 within a relative short time frame (e.g., within a week of product launch, etc.). As such, the operations computing system 320 can predict that the user may be more willing to utilize a vehicle service provided by an autonomous vehicle. For at least this reason, the operations computing system 320 can determine that the user and the autonomous vehicle fleet are compatible.

In some implementations, the operations computing system 320 can determine a compatibility 510 of a user and a first autonomous vehicle fleet (e.g., vehicle provider X's fleet, etc.) based at least in part on a similar autonomous vehicle fleet (e.g., vehicle provider Y's fleet, etc.). For example, the operations computing system 320 can identify an autonomous vehicle fleet that is similar to the first autonomous vehicle fleet based at least in part on the autonomy capabilities 410D of each fleet. The similar autonomous vehicle fleet can have similar autonomy capabilities 410D as the first autonomous vehicle fleet. Two autonomous vehicle fleets can be considered similar in the event that each fleet has approximately 70%, 80%, 90%, 95%, etc. similarity in autonomy capabilities 410D, that same or similar in maneuver capabilities or restrictions, and/or other factors. Similarity can be determined based on an algorithm that compares the autonomy capabilities 410D of each fleet (e.g., as stored in a list in memory 405, etc.).

The operations computing system 320 can obtain data indicative of a level of satisfaction of the user associated with the similar autonomous vehicle fleet. Such information can be determined from the user's autonomous vehicle usage history 420G and/or service rating(s) 420E. The operations computing system 320 can determine that the user and the autonomous vehicle fleet are compatible for the vehicle service based at least in part on the level of satisfaction of the user associated with the similar autonomous vehicle fleet. For example, in the event that the user provided a high service rating for a vehicle service provided by the similar autonomous vehicle fleet, the operations computing system 320 can determine that user would likely be satisfied with a vehicle service provided by the first autonomous vehicle fleet.

The operations computing system 320 can communicate data associated with the vehicle service request 360 for at least one selected autonomous vehicle fleet. This can include communicating data associated with the vehicle service request 360 to a second computing system associated with the autonomous vehicle fleet. In some implementations, the second computing system associated with the autonomous vehicle fleet can be a third party computing system 325 associated with a third party vehicle provider of the autonomous vehicle fleet. This can occur, for example, when the selected autonomous fleet includes third party autonomous vehicle(s) 315. Additionally, or alternatively, the second computing system associated with the autonomous vehicle fleet can be, for example, a vehicle computing system located onboard an autonomous vehicle of the autonomous vehicle fleet. This can occur, for example, when the selected autonomous vehicle fleet includes first party autonomous vehicle(s) 310 and/or it is permitted to communicate directly with a third party autonomous vehicle 315.

The data associated with the vehicle service request 360 can include various information. For example, the data associated with the vehicle service request 360 can be and/or can include a vehicle service assignment based at least in part on the vehicle service request 360. As described herein, the vehicle service assignment can indicate an origin, a destination, and/or other service conditions. The vehicle service assignment can be formulated as a command for an autonomous vehicle in the fleet to provide the vehicle service. The command may not be rejected unless the autonomous vehicle is physically unable to complete the vehicle service or it would be unsafe for the autonomous vehicle to do so. As described herein, the operations computing system 320 can utilize such commands for the autonomous vehicle(s) that are included in the dedicated supply of the service entity (e.g., first party autonomous vehicles 310). In some implementations, the vehicle service assignment can be formulated as a request for an autonomous vehicle in the fleet to provide the vehicle service. The request may be accepted or rejected. The operations computing system 320 can utilize such requests for the autonomous vehicle(s) that are included in the non-dedicated supply of the service entity (e.g., certain third party autonomous vehicles 315). In some implementations, the data associated with the vehicle service request 360 can include other information such as, for example, one or more of the user features 450 associated with the user, incentives for acceptance (e.g., increased compensation, priority treatment, etc.), and/or other information associated with the provision of the vehicle service.

In some implementations, the operations computing system 320 can communicate the data associated with the service request 360 based on a priority order of autonomous vehicle fleets or for a bidding opportunity. For example, as described herein, the operations computing system 320 can determine a plurality of selected autonomous vehicle fleets for the provision of the vehicle service. The operations computing system 320 can communicate data associated with the service request 360 to each of the plurality of selected autonomous vehicle fleets based at least in part on a priority order of the selected autonomous vehicle fleets (e.g., in their ranked compatibility score order as shown in FIG. 6) and/or with a request to bid for the vehicle service. The data associated with the service request 360 can be communicated to the next fleet (e.g., their associated onboard or offboard computing systems, etc.) in the priority order in the event it is rejected by the fleet associated with the higher priority. In some implementations, the data associated with the service request 360 can be communicated to all of the compatible autonomous vehicle fleets (e.g., their associated onboard or offboard computing systems, etc.) at the same or similar time frame with a request for the vehicle provider/autonomous vehicle fleet to bid for the vehicle service. The autonomous vehicle fleet/vehicle provider that provides the winning bid (e.g., lowest cost, fastest arrival time, etc.) can be assigned the vehicle service.

The vehicle service assignment can be accepted or rejected by a vehicle provider and/or autonomous vehicle. For example, the operations computing system 320 can obtain data indicative of an acceptance of the vehicle service (e.g., from a second computing system, etc.). In such a case, an autonomous vehicle of the autonomous vehicle fleet can be configured to initiate travel for the vehicle service (e.g., to travel to pick-up a user/item at the origin location, etc.). The operations computing system 320 can obtain data indicative of a rejection of the vehicle service (e.g., from a second computing system associated with vehicle provider X, etc.). In such a case, the operations computing system 320 can determine that the user and another autonomous vehicle fleet are compatible for the vehicle service. This can include, for example, the next highest ranked autonomous vehicle fleet (e.g., with the next highest compatibility score, etc.). The operations computing system 320 can communicate the data associated with the service request 360 to a third computing system associated with the other autonomous vehicle fleet (e.g., the computing system of vehicle provider Y, etc.).

Figure 8A:
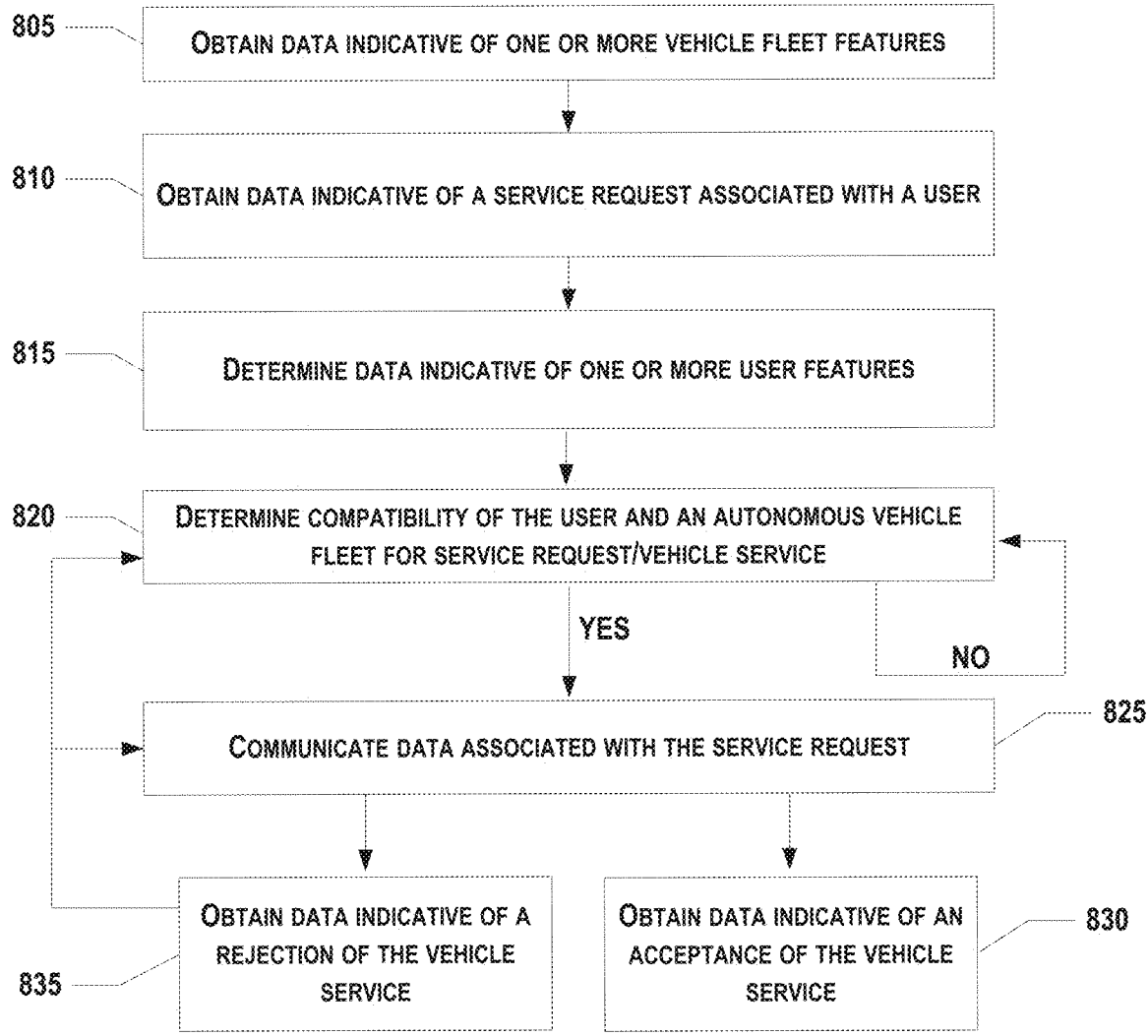
FIG. 8A depicts a flowchart of an example method for autonomous vehicle operation according to example embodiments of the present disclosure.

FIG. 8A depicts a flow diagram of an example method 800 for deploying and controlling autonomous vehicles for vehicle services according to example embodiments of the present disclosure. One or more portion(s) of the method 800 can be implemented by one or more computing devices such as, for example, the computing devices described in FIGS. 1, 2, 5, 9, and 10. Moreover, one or more portion(s) of the method 800 can be implemented as an algorithm on the hardware components of the device(s) described herein (e.g., as in FIGS. 1, 2, 5, 9, and 10) to, for example, deploying/controlling autonomous vehicles for vehicle services. FIG. 8A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (805), the method 800 can include obtaining data indicative of one or more vehicle fleet features. For instance, a first computing system (e.g., operations computing system 320, third party computing system 325, etc.) can obtain data indicative of one or more vehicle fleet features associated with an autonomous vehicle fleet. As described herein, the one or more vehicle fleet features can include one or more autonomy capabilities of one or more autonomous vehicles within the autonomous vehicle fleet. Additionally, or alternatively, the vehicle fleet features can include at least one of a user rating threshold, a vehicle service usage threshold, and/or a product adoption rate threshold.

At (810), the method 800 can include obtaining data indicative of a service request associated with a user. For instance, a first computing system can obtain data indicative of a vehicle service request associated with a user. The vehicle service request can be indicative of a request for a vehicle service. The vehicle service request can be indicative of an origin location and a destination location for the vehicle service.

At (815), the method 800 can include determining data indicative of one or more user features. For instance, a first computing system can determine, via a user profile, data indicative of one or more user features associated with the user, as described herein. The one or more user features can include at least one of: a user rating associated with the user, a vehicle service usage history associated with the user, a service rating provided by the user for at least one previous vehicle service, a cancellation rate associated with the user, a vehicle type preference associated with the user, a product adoption rate associated with the user, and/or an autonomous vehicle usage history associated with the user.

At (820), the method 800 can include determining compatibility of the user and an autonomous vehicle fleet for a vehicle service request/vehicle service. For instance, a first computing system can determine a compatibility of the user and the autonomous vehicle fleet for the vehicle service based at least in part on the one or more autonomy capabilities and the one or more user features. As described herein, determining the compatibility can include predicting how the one or more autonomous vehicles of the autonomous vehicle fleet will perform the vehicle service associated with the service request based at least in part on the autonomy capabilities. In some implementations, the first computing system can determine a candidate route from the origin location to the destination location (e.g., indicated in the vehicle service request, etc.) for the one or more autonomous vehicles of the autonomous vehicle fleet based at least in part on the one or more autonomy capabilities. The first computing system can predict that the user and the autonomous vehicle fleet are (or are not) compatible based at least in part on the candidate route. For example, the first computing system can predict a level of satisfaction of the user with the autonomous vehicle fleet based at least in part on the candidate route and the one or more user features.

The first computing system can determine compatibility based at least in part on other factors. For example, the first computing system can determine the compatibility of the user and the autonomous vehicle fleet for the vehicle service based at least in part on at least one of: the user rating threshold, the vehicle service usage threshold, or the product adoption rate threshold. In some implementations, the first computing system can predict the compatibility of the user and the autonomous vehicle fleet based at least in part on the one or more autonomy capabilities and the service rating provided by the user for the at least one previous vehicle service. The at least one previous vehicle service could have been provided via a human-driven vehicle. In some implementations, the first computing system can predict the compatibility of the user and the autonomous vehicle fleet based at least in part on the one or more autonomy capabilities and the cancellation rate associated with the user. In some implementations. The first computing system can determine a similar autonomous vehicle fleet based at least in part on the one or more autonomy capabilities. The first computing system can obtain data indicative of a level of satisfaction of the user associated with the similar autonomous vehicle fleet. The first computing system can determine the compatibility of the user and the autonomous vehicle fleet for the vehicle service based at least in part on the level of satisfaction of the user associated with the similar autonomous vehicle fleet.

At (825), the method 800 can include communicating data associated with the vehicle service request. For instance, a first computing system can communicate data associated with the service request to a second computing system associated with the autonomous vehicle fleet. The data associated with the service request can include information that can be utilized by an autonomous vehicle for determining whether to accept or reject the service request and/or for providing a vehicle service (e.g., user feature(s), origin location, destination location, route, user accommodations/preferences, time constraints, etc.). In some implementations, the second computing system associated with the autonomous vehicle fleet can be a computing system associated with a third party vehicle provider of the autonomous vehicle fleet. In some implementations, the second computing system associated with the autonomous vehicle fleet can be a vehicle computing system located onboard an autonomous vehicle of the autonomous vehicle fleet.

At (830), the method 800 can include obtaining data indicative of an acceptance of the vehicle service. For instance, in some implementations, a first computing system can obtain (e.g., from the second computing system, etc.) data indicative of an acceptance of the vehicle service. An autonomous vehicle of the autonomous vehicle fleet is configured to initiate travel for the vehicle service. That autonomous vehicle can be assigned the vehicle service request/vehicle service.

In some implementations, at (835), the method 800 can include obtaining data indicative of a rejection of the vehicle service. For instance, a computing system can obtain (e.g., from the second computing system, etc.) data indicative of a rejection of the vehicle service (e.g., by third party vehicle provider X, etc.). The first computing system (returning to operation/step 820) can determine the compatibility of the user and another autonomous vehicle fleet for the vehicle service. The first computing system can communicate the data associated with the service request to a third computing system associated with the other autonomous vehicle fleet (e.g., the computing system associated with third party vehicle provider Y, etc.). This process can be repeated until an autonomous vehicle (or human driven vehicle) is assigned to provide the vehicle service for the vehicle service request.

Figure 8B:
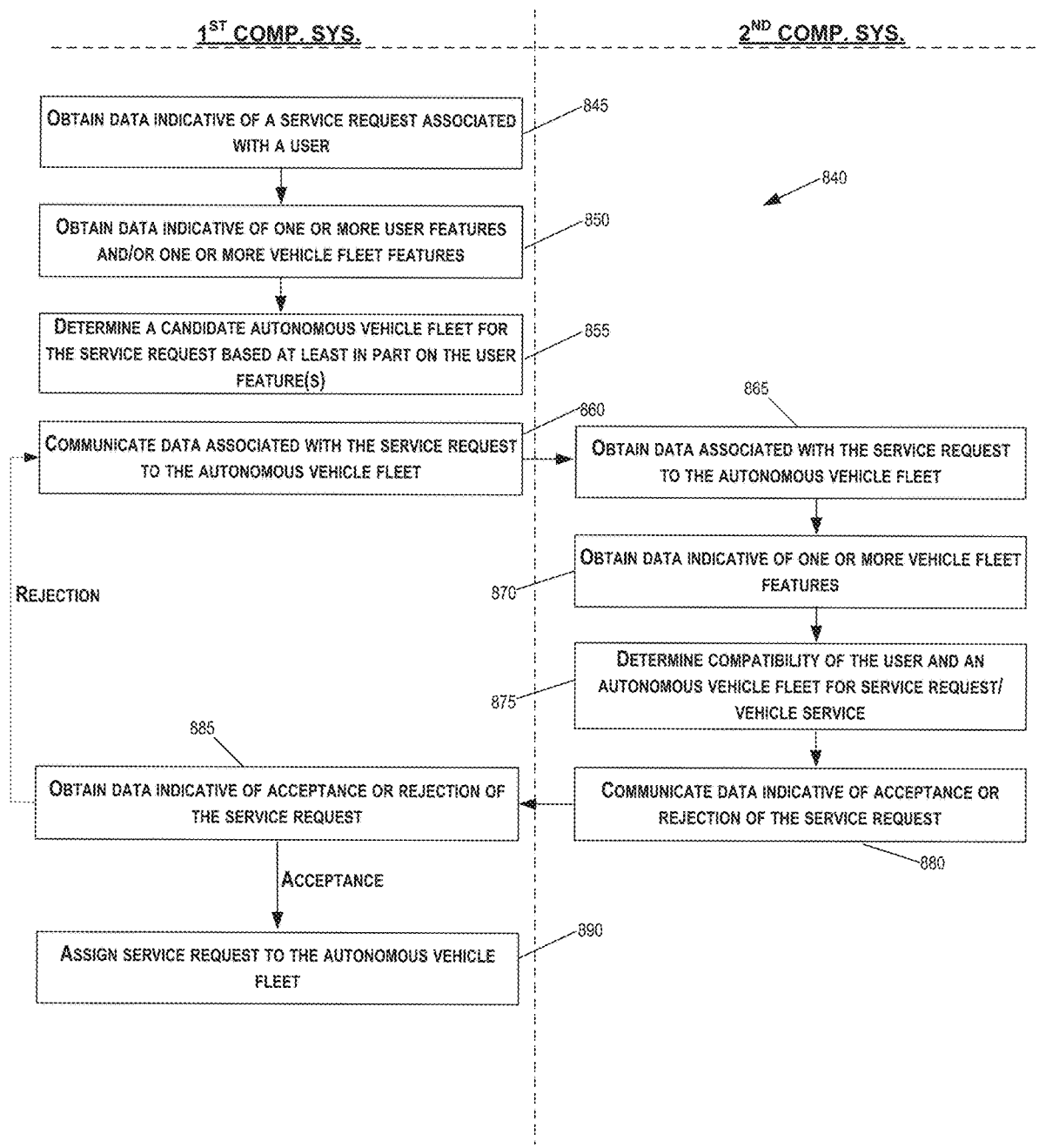
FIG. 8B depicts a flowchart of another example method for autonomous vehicle operation according to example embodiments of the present disclosure.

In some implementations, the filtering of users/vehicle service requests for a particular autonomous vehicle fleet can be distributed amongst a plurality of parties. For example, FIG. 8B depicts a flow diagram of an example method 840 for distributed filtering for the deployment of autonomous vehicles for vehicle services according to example embodiments of the present disclosure. One or more portion(s) of the method 840 can be implemented by one or more computing devices such as, for example, the computing devices described in FIGS. 1, 2, 5, 9, and 10. Moreover, one or more portion(s) of the method 840 can be implemented as an algorithm on the hardware components of the device(s) described herein (e.g., as in FIGS. 1, 2, 5, 9, and 10). FIG. 8B depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (845), the method 840 can include obtaining data indicative of a vehicle service request associated with a user. For instance, a first computing system (e.g., an operations computing system associated with a service entity, etc.) can obtain data indicative of a vehicle service request associated with a user. This can include a vehicle service request to transport the user and/or an item from an origin location to a destination location.

The operations computing system can perform a first filtering action based at least in part on the user feature(s) associated with the user. For example, at (850), the method 840 can include obtaining data indicative of one or more user features and/or one or more vehicle fleet features. A first computing system can obtain data indicative of one or more user features associated with the user (e.g., via a user profile with the service entity, etc.). The operations computing system can obtain data associated with one or more vehicle fleet features. This can include vehicle provider preferences such as, for example, user rating threshold(s), vehicle service usage threshold(s), or product adoption rate threshold(s).

At (855), the method 840 can include determining a candidate autonomous vehicle fleet for the service request based at least in part on the user feature(s). For instance, a first computing system can determine a candidate autonomous vehicle fleet for the vehicle service request based at least in part an initial compatibility of the user and the candidate autonomous vehicle fleet. The first computing system can determine the initial compatibility of the user and a candidate autonomous vehicle fleet based on the user feature(s) and the vehicle provider preference(s), in the manner(s) similar to that described herein for determining capability. By way of example, the first computing system can determine that the user and a candidate autonomous vehicle fleet are at least initially compatible because the user rating of the user is above the vehicle provider's preferred user rating threshold, the vehicle service usage history of the user is above the vehicle provider's preferred vehicle service usage threshold, and/or the product adoption rate of the user is above the vehicle provider's preferred product adoption rate. In some implementations, the first computing system may still pass along data associated with the vehicle service request to a vehicle provider even if the user does not meet any or all of these preferences.

At (860), the method 840 can include communicating data associated with the service request to the autonomous vehicle fleet. For instance, a first computing system can communicate data associated with the vehicle service request to a second computing system. The second computing system can be associated with the candidate autonomous vehicle fleet (e.g., a computing system onboard an autonomous vehicle, a vehicle provider computing system, etc.). The data associated with the vehicle service request can be indicative of the origin location, destination location, user preferences/accommodations, and/or other information that can help a vehicle provider and/or autonomous vehicle determine whether to undertake the requested vehicle service. In some implementations, the data associated with the service request can include one or more user features and/or one or more fleet features.

The second computing system can perform a second filtering action based at least in part on the vehicle fleet feature(s) associated with the candidate autonomous vehicle fleet and/or the user feature(s) associated with the user. For example, at (865), the method 840 can include obtaining data associated with the service request to the autonomous vehicle fleet. For instance, a second computing system (e.g., a third party computing system of a third party vehicle provider, etc.) can obtain the data associated with a service request (e.g., from the first computing system, etc.). As described herein, the data associated with a service request can be indicative of one or more user features. Additionally, or alternatively, the second computing system can obtain data indicative of user feature(s) from a database/memory associated with the second computing system (e.g., maintained by the third party vehicle provider based on previous vehicle services performed by the fleet).

At (870), the method 840 can include obtaining data indicative of one or more vehicle fleet features. The second computing system can obtain data indicative of one or more vehicle fleet features. For example, the second computing system can obtain data indicative of the autonomy capabilities of one or more autonomous vehicles in the candidate autonomous vehicle fleet associated with the third party vehicle provider (e.g., that is associated with the second computing system, etc.) and/or other features.

At (875), the method 840 can include determining compatibility of the user and an autonomous vehicle fleet for a vehicle service request/vehicle service. For instance, a second computing system can determine a compatibility (e.g., an updated/subsequent/vehicle provider compatibility, etc.) of the user and the candidate autonomous vehicle fleet based at least in part on the vehicle fleet feature(s) and/or the user feature(s). By way of example, the second computing system can determine whether the third party vehicle provider would be interested in accepting the vehicle service request based at least in part on the vehicle provider preferences (e.g., if the user's rating is above the user rating threshold, etc.). In another example, the second computing system can determine that the autonomous vehicle(s) in the autonomous vehicle fleet would need to take a long, inefficient route to complete the vehicle service request (e.g., to transport the user/item from the origin to the destination, etc.) based at least in part on the autonomy capabilities of the candidate autonomous vehicle fleet. As such, the second computing system can determine that the user and the fleet may not be compatible because the user is unlikely to be satisfied and/or the use of autonomous vehicle computing resources would be inefficient, too severe, etc.

At (880), the method 840 can include communicating data indicative of acceptance or rejection of the vehicle service request. For instance, a second computing system can communicate (e.g., to the operations computing system) data indicative of an acceptance or a rejection associated with the vehicle service request. This can include an indication of the acceptance or rejection and/or other information (e.g., a reason as to why the vehicle service request is being accepted or rejected).

At (885), the method 840 can include obtaining data indicative of acceptance or rejection of the vehicle service request. For instance, a first computing system can obtain the data indicative of the acceptance or the rejection associated with the vehicle service request. The first computing system can determine a vehicle service action based at least in part on the rejection or the acceptance associated with the vehicle service request. For instance, in the event that the third party vehicle provider/autonomous vehicle accepts the vehicle service request based at least in part on the compatibility, at (890), the first computing system can assign the vehicle service request to the candidate autonomous vehicle fleet (and/or an autonomous vehicle in the fleet). The first computing system can communicate the vehicle service assignment to the selected autonomous vehicle and/or the second computing system associated with the selected autonomous vehicle. In the event that the third party vehicle provider/autonomous vehicle rejects the vehicle service request based at least in part on the compatibility, the first computing system can determine another candidate autonomous vehicle fleet and the method 840 (or at least a portion thereof) can be repeated with that other candidate autonomous vehicle fleet.

Figure 9:
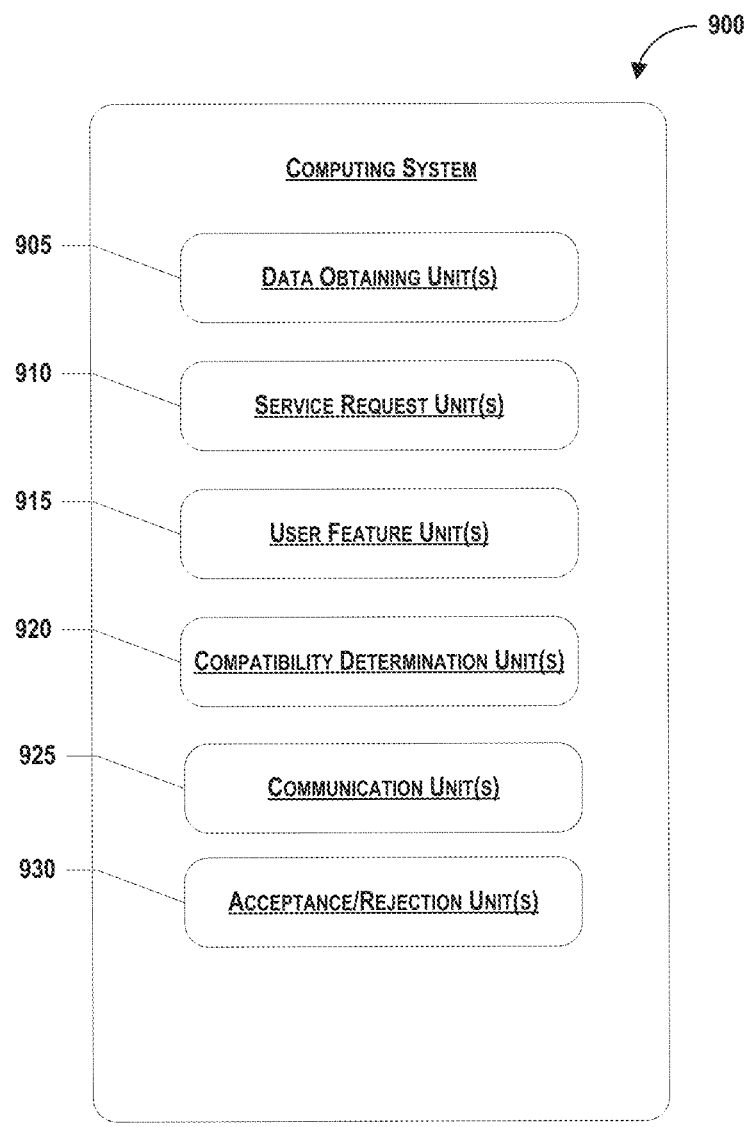
FIG. 9 depicts example units associated with a computing system for performing operations and functions according to example embodiments of the present disclosure.

Various means can be configured to perform the methods and processes described herein. FIG. 9 depicts example units associated with a computing system for performing operations and functions according to example embodiments of the present disclosure. As depicted, FIG. 9 depicts a computing system 900 that can include, but is not limited to, data obtaining unit(s) 905; service request unit(s) 910; user feature unit(s) 915; compatibility determination unit(s) 920; communication unit(s) 925; and acceptance/rejection unit(s) 930. In some implementations one or more units may be implemented separately. In some implementations, one or more units may be included in one or more other units.

These means can include various computing hardware. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein (including any or all of those of methods 800, 840 and the claims). For instance, the means (e.g., data obtaining unit(s), etc.) can be configured to obtain data indicative of one or more vehicle fleet features associated with an autonomous vehicle fleet. The one or more vehicle fleet features can include one or more autonomy capabilities of one or more autonomous vehicles within the autonomous vehicle fleet. Additionally, or alternatively, the vehicle fleet features can include at least one of a user rating threshold, a vehicle service usage threshold, a product adoption rate threshold, and/or other information.

The means (e.g., service request unit(s)) can be configured to obtain data indicative of a service request associated with a user. The service request can be indicative of a request for a vehicle service. The vehicle service request can be indicative of an origin location, a destination location for the vehicle service, a type of vehicle service, user preferences/accommodations, etc.

The means (e.g., user feature unit(s)) can be configured to identify data indicative of one or more user features associated with the user. For instance, the means can determine data indicative of one or more user features based at least in part a user profile and/or the data indicative of a vehicle service request, as described herein. The one or more user features can include at least one of: a user rating associated with the user, a vehicle service usage history associated with the user, a service rating provided by the user for at least one previous vehicle service, a cancellation rate associated with the user, a vehicle type preference associated with the user, a product adoption rate associated with the user, an autonomous vehicle usage history associated with the user, and/or other feature(s).

The means (e.g., compatibility determining unit(s)) can be configured to determine that the user and the autonomous vehicle fleet are compatible for the vehicle service based at least in part on the one or more autonomy capabilities and the one or more user features. The means can determine a compatibility of the user and the autonomous vehicle fleet for the vehicle service based at least in part on the one or more vehicle fleet features and the one or more user features. As described herein, determining the compatibility can include predicting how the one or more autonomous vehicles of the autonomous vehicle fleet will potentially perform the vehicle service associated with the service request based at least in part on the one or more vehicle fleet features (e.g., autonomy capabilities, etc.) and a potential user satisfaction with how the one or more autonomous vehicles of the autonomous vehicle fleet will potentially perform the vehicle service.

The means (e.g., communication unit(s)) can be configured to communicate data associated with the vehicle service request to a second computing system associated with the autonomous vehicle fleet. For instance, the means can communicate data associated with the vehicle service request to a computing system associated with a third party vehicle provider of the autonomous vehicle fleet and/or a vehicle computing system located onboard an autonomous vehicle of the autonomous vehicle fleet.

The means (e.g., acceptance/rejection unit(s)) can be configured to receive data indicative of an acceptance or a rejection of the vehicle service/service request from another system (e.g., of a vehicle provider). For instance, in some implementations, the means can obtain data indicative of an acceptance of the vehicle service or data indicative of a rejection of the vehicle service. Depending on the response, one or more operations of the means can be repeated until a match is found for the vehicle service request.

Figure 10:
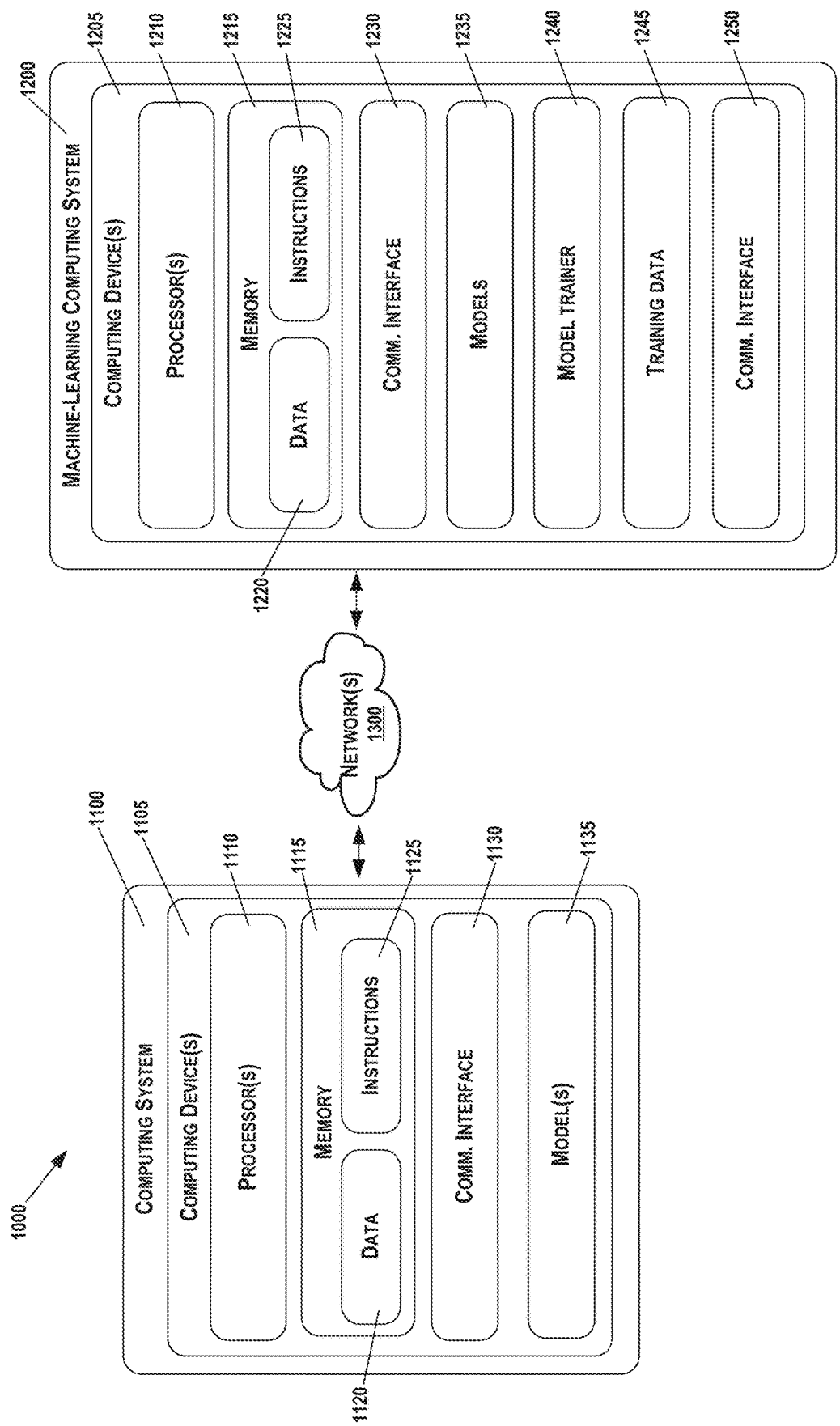
FIG. 10 depicts a block diagram of an example computing system according to example embodiments of the present disclosure.

FIG. 10 depicts a block diagram of an example computing system 1000 according to example embodiments of the present disclosure. The example system 1000 includes a computing system 1100 and a machine learning computing system 1200 that are communicatively coupled over one or more networks 1300.

In some implementations, the computing system 1100 can perform the functions and operations of one or more of the computing systems described herein (e.g., vehicle computing system, operations computing system, third party vehicle provider computing system, etc.). In some implementations, the computing system 1100 can be included in an autonomous vehicle. For example, the computing system 1100 can be onboard the autonomous vehicle. In other implementations, the computing system 1100 is not located on-board the autonomous vehicle. For example, the computing system 1100 can operate offline to support, coordinate, manage, etc. the autonomous vehicle (e.g., like that of an operations computing system, third party vehicle provider computing system, etc.). The computing system 1100 can include one or more distinct physical computing devices 1105.

The computing system 1100 can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, and/or stored. The data 1120 can include, for instance, perception data, prediction data, motion planning data, data indicative of vehicle operating modes, data associated with a vehicle service request, data indicative of vehicle tasks (e.g., vehicle service assignments, etc.), vehicle fleet features and/or other data associated with candidate autonomous vehicles/fleets, user features, weights, acceptance/rejection data, feedback data, vehicle/user location data, data associated with compatibility and/or compatibility scores (including initial compatibilities), data associated with fleet rankings, and/or any other data or information described herein. In some implementations, the computing system 1100 can obtain data from one or more memory device(s) that are remote from the computing system 1100.

The memory 1115 can also store computer-readable instructions 1125 that can be executed by the one or more processors 1120. The instructions 1125 can be software written in any suitable programming language or can be implemented in hardware. Additionally, or alternatively, the instructions 1125 can be executed in logically and/or virtually separate threads on processor(s) 1110.

For example, the memory 1115 can store instructions 1125 that when executed by the one or more processors 1110 cause the one or more processors 1110 (the computing system) to perform any of the operations and/or functions described herein, including, for example, the operations and/or functions of any of the following (or for which any of the following are configured): a vehicle computing system, an operations computing system, a third party vehicle provider computing system, one or more operations/steps of any of the methods described herein, one or more operations of any of the means described herein, etc.

By way of example, the instructions can cause the processor(s) 1110/computing system 1100 to perform operations including: obtaining data indicative of one or more vehicle fleet features associated with a first autonomous vehicle fleet (e.g., the one or more vehicle fleet features including one or more autonomy capabilities of one or more autonomous vehicles within the first autonomous vehicle fleet, etc.); obtaining data indicative of a vehicle service request associated with a user (e.g., the vehicle service request indicative of a request for a vehicle service, etc.); determining, via a user profile, data indicative of one or more user features associated with the user; and determining whether the user and the first autonomous vehicle fleet are compatible for the vehicle service based at least in part on the one or more autonomy capabilities of the one or more autonomous vehicles within the first autonomous vehicle fleet and the one or more user features. As described herein, determining whether the user and the first autonomous vehicle fleet are compatible for the vehicle service can include predicting how the one or more autonomous vehicles of the first autonomous vehicle fleet will perform the vehicle service associated with the vehicle service request based at least in part on the autonomy capabilities of the one or more autonomous vehicles (e.g., based on a projected route, arrival times, etc.). This can also include predicting whether the user will be satisfied with how the autonomous vehicle will perform the vehicle service. The operations can include, in response to determining that the user and the first autonomous vehicle fleet are compatible for the vehicle service, communicating data associated with the vehicle service request to a computing system associated with the first autonomous vehicle fleet. The operations can include, in response to determining that the user and the first autonomous vehicle fleet are not compatible for the vehicle service, determining whether the user and a second autonomous vehicle fleet are compatible for the vehicle service based at least in part on one or more autonomy capabilities of one or more autonomous vehicles within the second autonomous vehicle fleet and the one or more user features.

According to an aspect of the present disclosure, the computing system 1105 can store or include one or more machine-learned models 1135. As examples, the machine-learned models 1135 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110, etc.). In particular, the computing system 1100 can implement the machine learned model(s) 1135 to determine the compatibility of a user and an autonomous vehicle and/or an autonomous vehicle fleet. The machine-learned model(s) 1135 can include, for example, a machine-learned compatibility model.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, and/or stored. The data 1220 can include, for instance, include user features, vehicle fleet features, data associated with vehicle service requests, and/or any other data or information described herein. In some implementations, the machine learning computing system 1200 can obtain data from one or more memory device(s) that are remote from the machine learning computing system 1200.

The memory 1210 can also store computer-readable instructions 1225 that can be executed by the one or more processors 1210. The instructions 1225 can be software written in any suitable programming language or can be implemented in hardware. Additionally, or alternatively, the instructions 1225 can be executed in logically and/or virtually separate threads on processor(s) 1210.

For example, the memory 1215 can store instructions 1225 that when executed by the one or more processors 1210 cause the one or more processors 1210 (the computing system) to perform any of the operations and/or functions described herein, including, for example, the operations and/or functions of any of the following (or for which any of the following are configured): a vehicle computing system, an operations computing system, a third party vehicle provider computing system, one or more operations/steps of any of the methods described herein, one or more operations of any of the means described herein, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition or alternatively to the model(s) 1235 at the computing system 1100, the machine learning computing system 1200 can include one or more machine-learned models 1235. As examples, the machine-learned models 1235 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks. The machine-learned model(s) 1135 can include, for example, a machine-learned compatibility model.

As an example, the machine learning computing system 1200 can communicate with the computing system 1100 according to a client-server relationship. For example, the machine learning computing system 1200 can implement the machine-learned models 1235 to provide a web service to the computing system 1100. For example, the web service can provide vehicle service request compatibility determination for user(s) and vehicle(s).

Thus, machine-learned models 1135 can located and used at the computing system 1100 and/or machine-learned models 1235 can be located and used at the machine learning computing system 1200.

In some implementations, the machine learning computing system 1200 and/or the computing system 1100 can train the machine-learned models 1135 and/or 1235 through use of a model trainer 1240. The model trainer 1240 can train the machine-learned models 1135 and/or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 and/or 1235 based on a set of training data 1245. The training data 1245 can include, for example, the labeled training data can include annotations indicating a compatible user/fleet pair and/or an incompatible user/fleet pair. The model trainer 1240 can be implemented in hardware, firmware, and/or software controlling one or more processors.

The computing system 1100 and the machine learning computing system 1200 can each include a communication interface 1130 and 1250, respectively. The communication interfaces 1130/1250 can used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software and/or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 1300 can be accomplished, for instance, via a network interface using any type of protocol, protection scheme, encoding, format, packaging, etc.

FIG. 10 illustrates one example computing system 1000 that can be used to implement the present disclosure. Other computing systems can be used as well. For example, in some implementations, the computing system 1100 can include the model trainer 1240 and the training dataset 1245. In such implementations, the machine-learned models 1135, 1235 can be both trained and used locally at the computing system 1100. As another example, in some implementations, the computing system 1100 is not connected to other computing systems.

In addition, components illustrated and/or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the computer-implemented method comprising:
    obtaining, by a first computing system comprising one or more computing devices, data indicative of one or more vehicle fleet features associated with an autonomous vehicle fleet, wherein the one or more vehicle fleet features comprise one or more autonomy capabilities of one or more autonomous vehicles within the autonomous vehicle fleet;
    obtaining, by the first computing system, data indicative of a vehicle service request associated with a user, wherein the vehicle service request is indicative of a request for a vehicle service;
    determining, by the first computing system via a user profile, data indicative of one or more user features associated with the user;
    determining, by the first computing system, a compatibility of the user and the autonomous vehicle fleet for the vehicle service based at least in part on the one or more autonomy capabilities and the one or more user features, wherein determining the compatibility comprises predicting how the one or more autonomous vehicles of the autonomous vehicle fleet will perform the vehicle service associated with the vehicle service request based at least in part on the autonomy capabilities;
    communicating, by the first computing system, data associated with the vehicle service request to a second computing system associated with the autonomous vehicle fleet.

2. The computer-implemented method of claim 1, wherein the vehicle service request is indicative of an origin location and a destination location, and wherein determining the compatibility of the user and the autonomous vehicle fleet for the vehicle service comprises:
    determining, by the first computing system, a candidate route from the origin location to the destination location for the one or more autonomous vehicles of the autonomous vehicle fleet based at least in part on the one or more autonomy capabilities.

3. The computer-implemented method of claim 2, wherein determining the compatibility of the user and the autonomous vehicle fleet for the vehicle service comprises:
    predicting, by the first computing system, that the user and the autonomous vehicle fleet are compatible based at least in part on the candidate route.

4. The computer-implemented method of claim 3, wherein predicting that the user and the autonomous vehicle fleet are compatible based at least in part on the candidate route comprises:
    predicting, by the first computing system, a level of satisfaction of the user with the autonomous vehicle fleet based at least in part on the candidate route and the one or more user features.

5. The computer-implemented method of claim 1, wherein the vehicle fleet features further comprise at least one of a user rating threshold, a vehicle service usage threshold, or a product adoption rate threshold.

6. The computer-implemented method of claim 5, wherein determining the compatibility of the user and the autonomous vehicle fleet for the vehicle service comprises:
    determining, by the first computing system, the compatibility of the user and the autonomous vehicle fleet for the vehicle service based at least in part on at least one of the user rating threshold, the vehicle service usage threshold, or the product adoption rate threshold.

7. The computer-implemented method of claim 1, wherein the one or more user features comprise at least one of: a user rating associated with the user, a vehicle service usage history associated with the user, a service rating provided by the user for at least one previous vehicle service, a cancellation rate associated with the user, a vehicle type preference associated with the user, a product adoption rate associated with the user, or an autonomous vehicle usage history associated with the user.

8. The computer-implemented method of claim 7, wherein determining the compatibility of the user and the autonomous vehicle fleet for the vehicle service comprises:
    predicting, by the first computing system, the compatibility of the user and the autonomous vehicle fleet based at least in part on the one or more autonomy capabilities and the service rating provided by the user for the at least one previous vehicle service, wherein the at least one previous vehicle service was provided via a human-driven vehicle.

9. The computer-implemented method of claim 7, wherein determining the compatibility of the user and the autonomous vehicle fleet for the vehicle service comprises:
    predicting, by the first computing system, the compatibility of the user and the autonomous vehicle fleet based at least in part on the one or more autonomy capabilities and the cancellation rate associated with the user.

10. The computer-implemented method of claim 1, wherein determining the compatibility of the user and the autonomous vehicle fleet for the vehicle service comprises:
    determining, by the first computing system, a similar autonomous vehicle fleet based at least in part on the one or more autonomy capabilities;
    obtaining, by the first computing system, data indicative of a level of satisfaction of the user associated with the similar autonomous vehicle fleet; and
    determining, by the first computing system, the compatibility of the user and the autonomous vehicle fleet for the vehicle service based at least in part on the level of satisfaction of the user associated with the similar autonomous vehicle fleet.

11. The computer-implemented method of claim 1, wherein the second computing system associated with the autonomous vehicle fleet is a computing system associated with a third party vehicle provider of the autonomous vehicle fleet.

12. The computer-implemented method of claim 1, wherein the second computing system associated with the autonomous vehicle fleet is a vehicle computing system located onboard an autonomous vehicle of the autonomous vehicle fleet.

13. The computer-implemented method of claim 1, wherein the operations further comprise:
obtaining, by the first computing system from the second computing system, data indicative of an acceptance of the vehicle service, wherein an autonomous vehicle of the autonomous vehicle fleet is configured to initiate travel for the vehicle service.

14. The computer-implemented method of claim 1, wherein the operations further comprise:
obtaining, by the first computing system from the second computing system, data indicative of a rejection of the vehicle service;
determining, by the first computing system, the compatibility of the user and another autonomous vehicle fleet for the vehicle service; and
communicating, by the first computing system, the data associated with the vehicle service request to a third computing system associated with the other autonomous vehicle fleet.

15. A computing system comprising:
one or more processors; and
one or more memory devices, the one or more memory devices storing instructions that when executed by the one or more processors cause the one or more processors to perform operations, the operations comprising:
obtaining data indicative of a vehicle service request associated with a user, wherein the vehicle service request is indicative of a request for a vehicle service;
determining, via a user profile, data indicative of one or more user features associated with the user;
obtaining data indicative of one or more vehicle fleet features associated with each of a plurality of candidate autonomous vehicle fleets, wherein the one or more vehicle fleet features associated with a respective candidate autonomous vehicle fleet comprise autonomy capabilities of the respective autonomous vehicle fleet;
determining at least one selected autonomous vehicle fleet for the provision of the vehicle service based at least in part on the one or more user features and the autonomy capabilities of the at least one selected autonomous vehicle fleet, wherein determining the at least one selected autonomous vehicle fleet comprises predicting how one or more autonomous vehicles of the at least one selected autonomous vehicle fleet will perform the vehicle service associated with the vehicle service request based at least in part on the autonomy capabilities of the at least one selected autonomous vehicle fleet; and
communicating data associated with the vehicle service request for the at least one selected autonomous vehicle fleet.

16. The computing system of claim 15, wherein determining the at least one selected autonomous vehicle fleet for the provision of the vehicle service comprises:
predicting a willingness of the user to travel in an autonomous vehicle of the at least one selected autonomous vehicle fleet based at least in part on a product adoption rate associated with the user.

17. The computing system of claim 15, wherein determining the at least one selected autonomous vehicle fleet for the provision of the vehicle service comprises determining a plurality of selected autonomous vehicle fleets for the provision of the vehicle service, and wherein communicating data associated with the vehicle service request for the at least one selected autonomous vehicle fleet comprises:
communicating the data associated with the vehicle service request to each of the plurality of selected autonomous vehicle fleets based at least in part on a priority order of the selected autonomous vehicle fleets or with a request to bid for the vehicle service.

18. The computing system of claim 15, wherein the data associated with the vehicle service request comprises one or more of the user features associated with the user.

19. One or more tangible, non-transitory computer-readable media storing computer-readable instructions that when executed by one or more processors cause the one or more processors to perform operations comprising:
obtaining data indicative of one or more vehicle fleet features associated with a first autonomous vehicle fleet, wherein the one or more vehicle fleet features comprise one or more autonomy capabilities of one or more autonomous vehicles within the first autonomous vehicle fleet;
obtaining data indicative of a vehicle service request associated with a user, wherein the vehicle service request is indicative of a request for a vehicle service;
determining, via a user profile, data indicative of one or more user features associated with the user; and
determining whether the user and the first autonomous vehicle fleet are compatible for the vehicle service based at least in part on the one or more autonomy capabilities of the one or more autonomous vehicles within the first autonomous vehicle fleet and the one or more user features,
wherein determining whether the user and the first autonomous vehicle fleet are compatible for the vehicle service comprises predicting how the one or more autonomous vehicles of the first autonomous vehicle fleet will perform the vehicle service associated with the vehicle service request based at least in part on the autonomy capabilities of the one or more autonomous vehicles.

20. The one or more tangible, non-transitory computer-readable media of claim 19, wherein the operations further comprise:
in response to determining that the user and the first autonomous vehicle fleet are compatible for the vehicle service, communicating data associated with the vehicle service request to a computing system associated with the first autonomous vehicle fleet; or
in response to determining that the user and the first autonomous vehicle fleet are not compatible for the vehicle service, determining whether the user and a second autonomous vehicle fleet are compatible for the vehicle service based at least in part on one or more autonomy capabilities of one or more autonomous vehicles within the second autonomous vehicle fleet and the one or more user features.

* * * * *